(12) United States Patent
Kimoto

(10) Patent No.: US 7,984,396 B2
(45) Date of Patent: Jul. 19, 2011

(54) APPARATUS AND METHOD FOR DUMMY PATTERN ARRANGEMENT

(75) Inventor: Noriko Kimoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 399 days.

(21) Appl. No.: 12/222,634

(22) Filed: Aug. 13, 2008

(65) Prior Publication Data
US 2009/0055794 A1    Feb. 26, 2009

(30) Foreign Application Priority Data

Aug. 23, 2007   (JP) .................................. 2007-217464

(51) Int. Cl.
*G06F 17/50* (2006.01)

(52) U.S. Cl. ................. 716/55; 716/51; 430/5; 438/183

(58) Field of Classification Search .................... 716/51, 716/55; 430/5; 438/183
See application file for complete search history.

(56) References Cited

U.S. PATENT DOCUMENTS

| | | | |
|---|---|---|---|
| 5,018,210 A * | 5/1991 | Merryman et al. | 382/145 |
| 5,636,133 A * | 6/1997 | Chesebro et al. | 716/4 |
| 6,080,661 A * | 6/2000 | Bothra | 438/637 |
| 6,323,113 B1 * | 11/2001 | Gabriel et al. | 438/584 |
| 6,901,575 B2 * | 5/2005 | Wu et al. | 716/19 |
| 7,062,732 B2 * | 6/2006 | Ito et al. | 716/5 |
| 7,261,984 B2 * | 8/2007 | Ibusuki | 430/30 |
| 7,368,737 B2 * | 5/2008 | Inanami et al. | 250/492.22 |
| 7,500,219 B2 * | 3/2009 | Ogino et al. | 716/21 |
| 7,673,270 B1 * | 3/2010 | Wang et al. | 716/12 |
| 7,772,070 B2 * | 8/2010 | Kitajima et al. | 438/275 |
| 2003/0204832 A1 | 10/2003 | Matumoto | |
| 2005/0193364 A1 * | 9/2005 | Kotani et al. | 716/21 |
| 2007/0023653 A1 * | 2/2007 | Toyoda et al. | 250/310 |

FOREIGN PATENT DOCUMENTS

JP   2003-324149 A   11/2003

* cited by examiner

*Primary Examiner* — Naum Levin
(74) *Attorney, Agent, or Firm* — Foley & Lardner LLP

(57) ABSTRACT

The EB data is separated into an area A and other area. The area A is covered by a recognition layer to which an algorism is linked to form a recognition layer A. For arranging a same dummy pattern for respective areas A, a dummy pattern creation starting point is designated in a common position for each recognition layer A. When there are areas A which have different rotation angles, the recognition layer is created to satisfy a condition that, even if any corner of the area A is designated as the dummy pattern creation starting point, the created dummy pattern becomes an identical arrangement. The sizes DP and gaps GAP of the dummy pattern elements composing the dummy pattern are respectively same in X-direction and Y-direction. The size of the recognition layer A is determined by: a multiple of (DP+GAP)+DP, in X and Y-direction respectively.

8 Claims, 34 Drawing Sheets

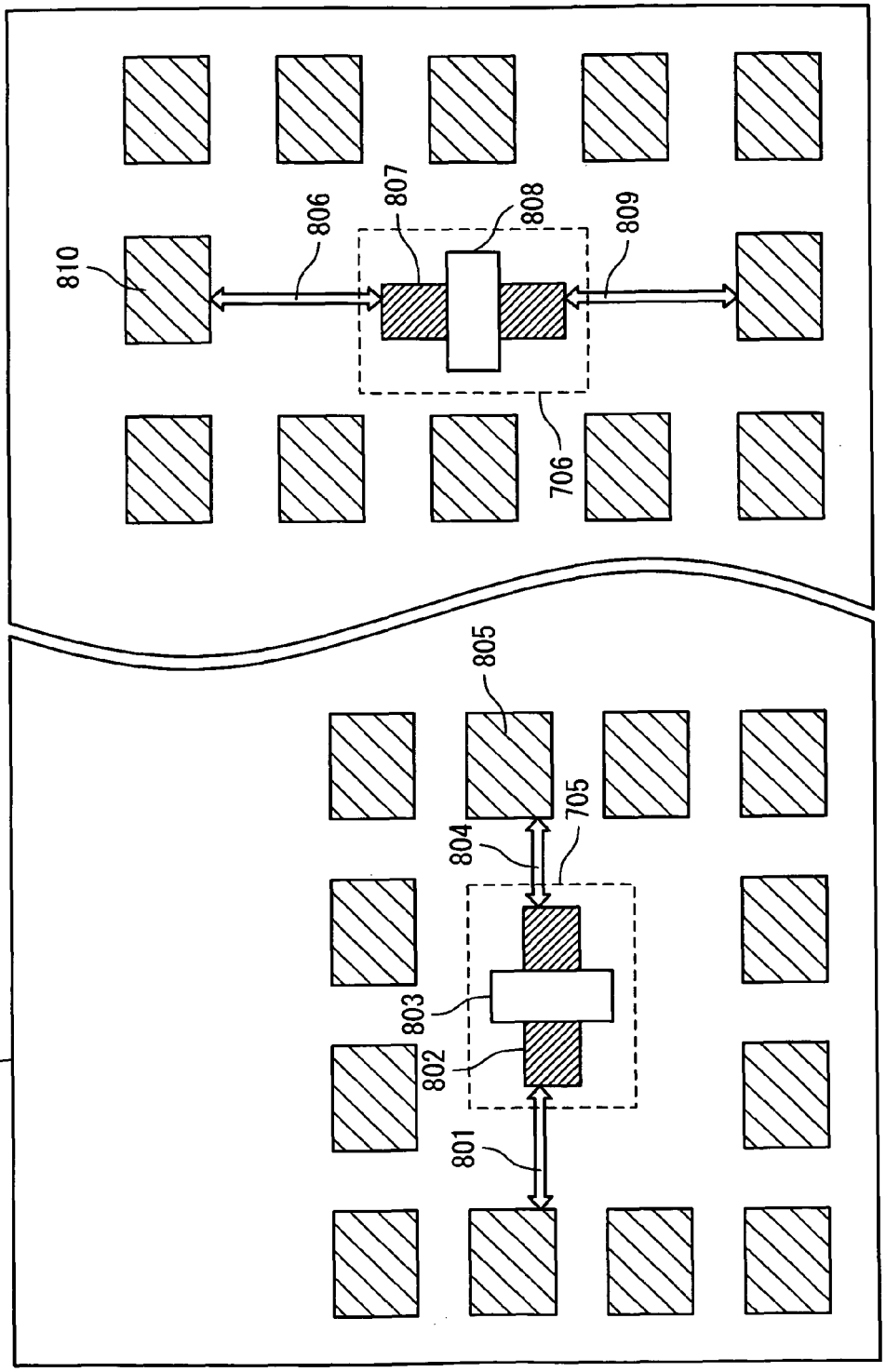

APPARATUS AND METHOD FOR DUMMY PATTERN ARRANGEMENT

INCORPORATION BY REFERENCE

This patent application is based on Japanese Patent Application No. 2007-217464. The disclosure of the Japanese Patent Application is incorporated herein by reference.

BACKGROUND OF THE INVENTION

1. Field of the Invention

The present invention relates to a dummy pattern arrangement apparatus, and more specifically, to a dummy pattern arrangement apparatus used in a design process of a semiconductor integrated circuit.

2. Description of Related Art

In designing of a layout of a semiconductor device, data for forming dummy pattern is created. The meaning of the dummy pattern will be described before explaining embodiments of the present invention. FIGS. 1A, 1B, and 1C are diagrams for explaining significances of the dummy pattern.

FIG. 1A shows a layout of a common MOS (Metal-Oxide-Semiconductor) transistor.

An area 101 includes a gate 102 and a diffusion layer 103. The area 101 is an area in which the finished shape of the gate 102 and the diffusion layer 103 which form an element is required to be formed in high precision. In the following, such an area 101 is designated as the area A. Here, the area A is supposed to be a rectangle form, unless it is mentioned otherwise specially.

FIG. 1B shows a plan view after formation of an element.

As finer microfabrication proceeds, it becomes more difficult to attain uniform manufacturing accuracy. An area A 104 that is a portion corresponding to the area A after the diffusion process becomes a gate 105 and a diffusion layer 106 as shown in FIG. 1B, for example. In FIG. 1B, the finished shape of the diffusion layer 106 is smaller than the originally expected shape 107.

In order to flatten a surface, the surface is polished by the CMP (Chemical Mechanical Polishing) process. However, in order to suppress variations of the polished amount, it is required to suppress variation of data density of a portion corresponding to the area A.

For resolving the problem, a MOS transistor takes a configuration shown in FIG. 1C, for example.

As shown in this plan view FIG. 1C, pattern 111 for attaining uniformity of the density is arranged in a vicinity of a gate 109 and a diffusion layer 110 in design in an area A 108 that is a portion corresponding to the area A. In this case, the pattern 111 is a pattern consisting of a plurality of pattern elements arranged in a grid formation and formed in a same process as the diffusion layer 110.

Similarly, also in the gate process, etching amount varies by ununiformity of data density, which brings a problem that the formed element does not have the desired shape. Therefore, similarly to the diffusion layer case, it is required to arrange pattern for attaining the uniformity of the density.

Here, a shaped pattern which does not function as a part of a circuit component like an electronic elements or wiring and is arranged optionally in a portion where the data density is coarse is called as a "dummy pattern." The pattern 111 is a dummy pattern.

An EB operation is known as a technique used in arranging the dummy pattern.

In the EB operation, EB data (Electron Beam Exposure Data or Electron-Beam Lithography Data) is created. For example, the EB data for producing a photomask of an LSI (Large Scale Integration) is created by converting the layout data created by a designer with CAD (Computer Aided Design).

FIG. 2 is a plan view for explaining a starting point of the dummy pattern arrangement in the case of using a common EB operation.

In a common EB operation, for generating dummy pattern on a predetermined area A 201, the starting point of the dummy pattern creation is commonly set at the lower-left point 202 shown in FIG. 2.

FIG. 3 shows a common method of layout-arrangement of a dummy pattern in the EB operation.

Generally, after arranging elements 301 required for functions of the product, dummy patterns 302 that are formed in a same processing layer by a program used finally at the time of EB shipment are arranged in a gap area. A gap area means that any circuit element or interconnection is not formed on the area, namely, the area is an empty or blank space on a chip area. Here, the program used at the time of the EB shipment is called as the EB operation.

Processing in the EB operation is usually performed as follows.

(1) An X-direction size 303 and a Y-direction size 304 of each dummy pattern are specified. Each dummy pattern element composing the dummy pattern 302 shows a shape with specified sizes.

(2) A lower-left point 305 of the data indicating a region on which dummy pattern is arranged is set to a starting point, and the X-direction arrangement gap 306 and the Y-direction arrangement gap 307 between adjacent dummy pattern elements are specified.

(3) Each dummy pattern element keeps a certain gap 308 to a shaped pattern forming an element, and also keeps a certain gap to an element 301. On a region where such a gap cannot be kept, no dummy pattern element is generated.

FIG. 4A is a layout flow that adopts a dummy pattern arrangement method in a common EB operation. Hereafter, this layout flow is called as a related technique 1.

(1) Step S401

Circuit information for forming discrete components is referred to.

(2) Step S402

The discrete component data is formed based on the circuit information for creating the discrete components.

(3) Step S403

It is judged by checking whether there is any problem in the shapes of the discrete components. If there is any problem in the shapes of the discrete components, namely, the shapes of the discrete components do not satisfy a predetermined checking rule, the discrete component data are re-created. In the following, the representation "there is any problem," "there is no problem" and the like are used in this meaning.

(4) Step S404

If it is judged that there is no problem in the shapes of the discrete components, the circuit information for creating a functional block is referred to.

(5) Step S405

In a functional block data creation process, the functional block data is created based on the circuit information for creating the functional block.

(6) Step S406

Regarding the created functional block data, it is judged by checking whether there is any problem in the shape of the functional block. If there is any problem in the shape of the functional block, the flow returns to the functional block data creation process, and the functional block data is re-created.

(7) Step S407

If there is no problem in the shape of the functional block, the circuit information for creating a 1-chip layout is referred to.

(8) Step S408

In a 1-chip layout process, the data of 1-chip layout is created based on the circuit information for creating the 1-chip layout.

(9) Step S409

Regarding the created data of 1-chip layout, it is judged by checking whether there is any problem in the shape of the 1-chip layout is performed. If there is any problem in the shape of the 1-chip layout, the flow returns to the 1-chip layout process, and the data of 1-chip layout is re-created.

(10) Step S410

If there is no problem in the shape of the 1-chip layout, the GDS data to EB data conversion process is performed, in which the GDS (General Data Stream) data is converted into the EB data.

(11) Step S411

Information of a specification of dummy pattern arrangement is referred to.

(12) Step S412

A dummy pattern arrangement process is performed to the data obtained in the GDS data to EB data conversion process. In this process, the dummy pattern is arranged based on the information of the specification of dummy pattern arrangement.

(13) Step S413

Regarding the created data of dummy pattern arrangement, it is judged by checking whether there is any problem in the shape of the dummy pattern. If there is a problem in the shape of the dummy pattern, the flow returns to the GDS data to EB data conversion process, where the conversion processing is redone and the dummy pattern is rearranged similarly with the above-mentioned processing.

(14) Step S414

If there is no problem in the shape of the dummy pattern, the created data as the result of above processing is shipped as the EB data in the EB shipment process.

FIG. 4B is a layout flow of a method different from the related technique 1. Hereinafter, this method is called as a related technique 2.

The related technique 2 is different from the related technique 1 in a check process of the 1-chip layout. Specifically, the dummy pattern arrangement process and the GDS data to EB data conversion process are interchanged in order. Therefore, the processing of the steps until the step S408 is performed similarly with the related technique 1 shown in FIG. 4A. After the step S408, the step S415 and thereafter explained below are performed in the related technique 2.

(15) Step S415

The 1-chip layout check is performed. A flow to step S415 is the same as those of steps S401 to S408 of FIG. 4A.

(16) Step S416

A specification of dummy pattern arrangement is referred to after the 1-chip layout check.

(17) Step S417

In the dummy pattern arrangement process, the dummy patterns are arranged based on the specification of dummy pattern arrangement.

(18) Step S418

Next, the processing of converting GDS data which is a result of the foregoing processes into EB data is performed at the GDS data to EB data conversion process.

(19) Step S419

It is judged by checking whether there is any problem in the shape of the dummy patterns. If there is any problem in the shape of the dummy pattern, the flow returns to the dummy pattern arrangement process, where the dummy pattern is rearranged similarly to the above-mentioned processing.

(20) Step S420

If there is no problem in the shape of the dummy pattern, the created data as the result of above processing is shipped as the EB data in the EB data shipment process.

In the following, an explanation is given based on the processing shown in the flow of FIG. 4A.

In the above mentioned explanation of related techniques, the variation of density is suppressed in a certain level, although the dummy pattern arrangement is roughly determined. However, in recent years, microfabrication of pattern has proceeded into even finer, and higher precision in finished products is required. Moreover, since the finished shape of an element depends on the shape of the dummy pattern around the element, also for the dummy pattern arrangement, a specification considering the required finished precision has become sought.

However, when an identical performance is required for each of the patterns having a same shape, if the shapes of the dummy patterns that is respectively arranged in the vicinity of the elements with the same shape is different from one another, the finished shapes of the elements will be different and they cannot exhibit a same transistor characteristic. Therefore, it is required to arrange dummy patterns with an identical shape in the vicinity of respective elements that are required to have an identical shape and high precision.

As shown in FIG. 5, designating the vicinity of each of elements (an element 502 and an element 503) having a same shape in a chip area 501 as the area A (an area A 504 and an area A 505), it is required for the dummy patterns with the identical shape to be arranged in the respective areas A (the area A 504 and the area A 505).

At this time, the sizes of the area A 504 and the area A 505 that are the areas A are the same. Moreover, arrangement orientations of the element 502 and the element 503 in the respective areas A are the same.

When the layout flow (the related technique 1 of FIG. 4A) adopting a dummy pattern arrangement in a common EB operation is performed, the starting point of the dummy pattern creation is fixed to the lower-left point 506 of the respective area in which the dummy patterns are to be created.

When more than two areas (the area A 504 and the area A 505) in which dummy patterns are to be created respectively exist in a chip area 501, since the dummy pattern creation starting point is set to the lower-left point 506 of the chip area, and the dummy pattern is created for the whole surface of the chip area 501, the relations between the respective areas A (the area A 504 and the area A 505) and the dummy pattern creation starting point become different, and the arrangement of the dummy patterns in respective areas A are no longer the identical shape. Therefore, the dummy patterns arranged in the respective vicinities of elements 502 and 503 do not have a same arrangement.

Referring to FIG. 6, this problem is explained in detail in the case that the layout flow of the related technique 1 is executed.

The chip area 600 corresponds to the chip area 501 in FIG. 5. The diffusion layer 601 and the gate 602 correspond to the element 502 shown in FIG. 5. The diffusion layer 603 and the gate 604 correspond to the element 503 shown in FIG. 5. The diffusion layer 601 and the diffusion layer 603 are formed in the same process as the dummy pattern 605.

In the vicinity of the element 502, the gaps between the dummy pattern and the element 502 are shown in FIG. 6 as the gap 606 and the gap 607. Note here that since the locations of the dummy patterns are determined on the basis of the creation starting point 506 shown in FIG. 5, the dummy pattern arrangement in the vicinity of the element 503 can be different from that of in the vicinity of the element 502.

For example, in the vicinity of the element 503, the gaps 608, 609 between the dummy pattern and the element 503 are shown in FIG. 6, which is different from the gaps 606, 607 in the vicinity of the element 502. As shown in this case, the dummy pattern arrangements in the vicinity of the element 502 and the element 503 existing in the area A 504 and the area A 505 shown in FIG. 5, respectively, can be different from each other. Therefore, a finished shape of the element existing in each area can be different from each other, and it becomes difficult to expect a same transistor characteristic between them.

FIG. 7 shows a plan view of a layout in the case where the orientation of an area A is different from that of another area A. A chip area 701 shows an area on a chip. A lower-left point 702 is the dummy pattern creation starting point. An area A 703 and an area A 704 show dummy pattern creation areas A. An element 705 and an element 706 show elements to be formed on respective dummy pattern creation areas A. In an example shown in FIG. 7, a dummy pattern creation area A and another dummy pattern creation area A have a same shape and arranged in orientations different from each other by 90°.

FIG. 8 shows a layout showing relations between elements existing in a dummy pattern creation area A and the dummy patterns, from which a problem similar to the above-mentioned case regarding FIG. 6 occurs. The chip area 800 corresponds to the chip area 701 in FIG. 7. As shown in FIG. 7, a first area A and a second area A which have same shape are arranged in respective orientations different from one another by 90° on a chip. The relations between elements in dummy pattern creation areas A and the dummy patterns created thereon of the first and second areas A are as follows. In the first area, the gaps between "a diffusion layer 802 and a gate 803 which correspond to the element 705 of FIG. 7" and a "nearest dummy pattern among dummy patterns 805 arranged in the vicinity" are shown in FIG. 8 as the gaps 801, 804. In the second area, the gaps between "a diffusion layer 807 and a gate 808 which correspond to the element 706 of FIG. 7" and "the nearest dummy pattern among dummy patterns 810 arranged in the vicinity" are shown in FIG. 8 as the gaps 806, 809, which are different from the gaps 801, 804 in the first area A. Similarly, an arrangement relation between an element and a dummy pattern existing in each area can be different from those of other areas.

For overcoming the above mentioned problem occurred in the related technique 1, the related technique 2 can be adopted as below.

FIGS. 9A and 9B show a layout flow of a related technique 2 in which "in order to make dummy patterns having a same shape in the areas A, the dummy patterns only in the areas A are created at a stage of layout formation and are arranged in the areas A." This is referred to as the related technique 2 in the following.

(1) Step S901

Circuit information for forming discrete components is referred to.

(2) Step S902

The discrete component data is created based on the circuit information for creating the discrete components.

(3) Step S903

It is judged by checking whether there is any problem in the shape of the discrete components. If there is any problem in the shapes of the discrete components, the discrete component data are re-created.

(4) Step S904

If it is judged that there is no problem in the shapes of the discrete components, the circuit information for creating the functional block is referred to.

(5) Step S905

In a functional block data creation process, the functional block data is created based on the circuit information for creating the functional block.

(6) Step S906

Regarding the created functional block data, it is judged by checking whether there is any problem in the shape of the functional block. If there is any problem in the shape of the functional block, the flow returns to the functional block data creation process, and the functional block data is re-created.

(7) Step S907

If there is no problem in the shape of the functional block, information of the specification of dummy pattern arrangement in a specific area is referred to.

(8) Step S908

In a dummy pattern arrangement process, the dummy pattern is arranged in the data processed in the functional block data creation process based on the information of the specification of dummy pattern arrangement of the specific area.

(9) Step S909

To the created dummy pattern arrangement, it is determined by checking whether there is any problem in the shape of the dummy pattern. If there is any problem in the shape of the dummy pattern, the flow returns to the GDS data to EB data conversion process, where the conversion processing is redone and the dummy pattern is rearranged similarly with the above-mentioned processing.

(10) Step S910

If there is no problem in the shape of the dummy pattern, the circuit information for creating the 1-chip layout will be referred to.

(11) Step S911

In the 1-chip layout process, a 1-chip layout is created based on the circuit information for creating the 1-chip layout.

(12) Step S912

To the created 1-chip layout, it is judged by checking whether there is any problem in the shape of the 1-chip layout. If there is any problem in the shape of the 1-chip layout, the flow returns to the 1-chip layout process, and the 1-chip layout will be re-created.

(13) Step S913

If there is no problem in the shape of the 1-chip layout, the conversion processing of converting the GDS data into the EB data will be performed in the GDS data to EB data conversion process.

(14) Step S914

The information of the specification of dummy pattern arrangement for non-specific area is referred to. The non-specific area means an area other than the previously mentioned specific area.

(15) Step S915

In a dummy pattern arrangement process, the dummy pattern is arranged in the data processed in the GDS data to EB data conversion process based on the information of the specification of dummy pattern arrangement for non-specific area.

(16) Step S916

To the created dummy pattern arrangement, it is judged by checking whether there is any problem in the shape of the dummy pattern. If there is any problem in the shape of the dummy pattern, the flow returns to the GDS data to EB data conversion process, where the conversion processing is redone and the dummy patterns are rearranged similarly with the above-mentioned processing.

(17) Step S917

If there is no problem in the shape of the dummy pattern, the created data as the result of above processing is shipped as the EB data in the EB data shipment process.

In the layout flow of a related technique shown in FIGS. 9A and 9B, a plurality of areas A are arranged on a various positions and orientations (namely, rotation angles) in the layout. The dummy patterns of the respective areas A are created so that the dummy pattern arrangements in respective areas A are same with each other. The step S907, step S908, and step S909 shown in FIGS. 9A and 9B (the dummy pattern arrangement process of a specific area after the functional block data creation process) are the processing stages for making the dummy pattern arrangements of the respective areas A to be same with each other. The dummy pattern arrangement for a portion other than the areas A is performed with the EB operation based on the specification for non-specific area dummy pattern arrangement, like processing stages of step S914 and step S915 shown in FIGS. 9A and 9B.

FIGS. 10A, 10B, 11A, 11B, 11C, 12A, and 12B are layout flows explaining the problems in the dummy pattern arrangement caused by the use of the related technique 2. FIGS. 10A, 10B, 11A, 11B, 11C, 12A, and 12B illustrate different problems, respectively. In these flow charts, the processing stages of step S901 to step S917 are common with those of FIGS. 9A, 9B.

Here, there are the following three problems.

Problem 1: The dummy pattern creation is performed each time the layout is corrected (FIGS. 10A and 10B).

Problem 2: The GDS data hierarchical structure is subjected to correction for the dummy pattern creation (FIGS. 11A, 11B, and 11C).

Problem 3: Since the dummy patterns are created on the GDS data, the amount of the GDS data being processed is large (FIGS. 12A and 12B).

These problems are explained below in detail.

Problem 1: "The dummy pattern creation is performed each time the layout is corrected."

The problem 1 which occurs in the layout flow shown in the FIGS. 9A and 9B will be explained referring to FIGS. 10A and 10B.

In FIGS. 10A and 10B, the dummy pattern arrangement process (step S1001) and specification change (step S1002) are added comparing with the flow shown in FIGS. 9A and 9B. The dummy pattern arrangement process (step S1001) includes the dummy pattern arrangement process (step S908) and check process for checking the arranged dummy pattern (step S909). Specification change (step S1002) is performed to the circuit information that is referred to in a discrete component creation process (step S902) and the functional block data creation process (step S905). That is, the specification change is done when the circuit information is referred to at step S901 and step S904, or before the steps.

A dummy pattern is required to be arranged in a position where the dummy pattern and an element is not overlapped. Namely, a gap 308 is required to be kept between an element 301 and the dummy pattern, as explained in FIG. 3.

In the related technique 2 shown in FIGS. 10A and 10B, the dummy pattern is arranged after the layout of circuit components is created. Therefore, when a layout specification is changed, the dummy pattern on the area A is required to be re-created associated with this change, which requires a large amount of processing.

That is, after finishing the dummy pattern arrangement process (step S1001) shown in FIGS. 10A and 10B, if there occurs the specification change (step S1002) in the discrete component creation process (step S902) or the functional block data creation process (step S905), the shape of the element 301 changes.

To avoid this unintentional change of the element shape, it is also required to change the arrangement gap 308, and accordingly it becomes necessary to redo the dummy pattern arrangement process (step S908) and the check process (step S909) shown at step S1001.

Problem 2: "The GDS data hierarchical structure is subjected to correction for the dummy pattern creation."

The problem 2 in the layout flow shown in the above-mentioned FIGS. 9A and 9B will be explained referring to the flow chart of FIGS. 11A and 11B and the layout arrangement shown in FIG. 11C.

The step S1101 shown in FIG. 11A is a cell-forming arrangement process of the dummy patterns that accompanies the data hierarchical structure correction. This cell-forming arrangement process is performed between the dummy pattern arrangement process (step S908) and the check process (step S909).

As shown in FIG. 11C, a 1-chip area (the chip area) 1100 includes a block B 1110, a block B 1120, and a block B 1130. The block B 1110 includes an area A 1111. The block B 1120 includes an area A 1121. The block B 1130 includes an area A 1131.

The block B 1110, the block B 1120, and the block B 1130 shown in FIG. 11C have a common configuration. An explanation will be given for a case where the area A 1111, the area A 1121, and the area A 1131 are formed to be a same shape.

In FIG. 11C, the areas A (the area A 1111, the area A 1121, and the area A 1131) are placed in the blocks B (the block B 1110, the block B 1120, and the block B 1130) respectively to construct a hierarchical structure. If a dummy pattern on the area A are kept to be arranged on the 1-chip area 1100 which is the top level of the layout hierarchical structure, the dummy patterns placed on the top hierarchy must be individually arranged on respective areas A (the area A 1111, the area A 1121, and the area A 1131) of the respective blocks B (the block B 1110, the block B 1120, the block B 1130).

In this case, for the block B in which the area A exists, it is generally more efficient to insert the dummy pattern for the area A. Therefore it is required to re-execute a dummy pattern cell-forming arrangement process (step S1101) associated with the correction of hierarchical structure level of data by which the dummy pattern is arranged on a hierarchical level of block B after the creation of the dummy data, and the subsequent processes. As a result, the amount of processing for correction and check increases.

In many cases, the data created in the discrete component creation process (step S902) or in the functional block data creation process (step S905) forms a cell. When the area A exists in this cell and a dummy pattern is required to be arranged in the area A, the correction of the hierarchical level of the dummy pattern and the subsequent processes are required.

Problem 3: "Since the dummy patterns are created on the GDS data, the amount of the GDS data being processed is large."

The problem 3 which occurs in the layout flow shown in FIGS. 9A and 9B will be explained using FIGS. 12A and 12B.

In FIGS. 12A and 12B, a layout flow includes a circuit information reference process (step S901), a layout process (step S1201), an EB operation process (step S1202), and a shipment process (step S917). The "layout process (step S1201)" includes the "discrete component creation process (step S902)" to the "GDS data to EB data conversion process (step S913 (before conversion))". The "EB operation process (step S1202)" includes the "GDS data to EB data conversion process (step S913 (after conversion))" to the "dummy pattern shape check process (step S916)."

A person in charge of layout creates, corrects and checks data in GDS format. In drawings, GDS data is used in the layout process (step S1201), and the EB data is used in the EB operation process (step S1202).

Since the dummy pattern for the area A is arranged in step S908, the amount of the GDS data increases in this process.

Associated with the increase of the amount of the GDS data, the time required to check the layout becomes large. Moreover, along with this, the area for storing the GDS data increases, so that the load of a process from the dummy pattern arrangement process (step S908) to step S913 becomes large.

That is, like the dummy pattern arrangement process (step S908) in FIGS. 12A and 12B, in a case where the dummy pattern creation on the area A is performed in the layout process (step S1201), it is required to hold data of the dummy pattern in the area A on the GDS data.

Therefore, a person in charge of layout has to deal with and manage a large amount of GDS data.

In Japanese Laid-Open Patent Application JP-P2003-324149A (referred to as the patent document 1), a technique for suppressing density variation by arranging dummy pattern is described. In this technique, the suppression of density variation is performed by arranging dummy patterns having various sizes, which is different from the above explained related techniques in which dummy patterns having same shape are arranged in a constant interval.

In above mentioned related techniques, dummy patterns only in the area A are created at a stage of layout formation in order to make the shapes of the dummy patterns being same to each other to arrange the dummy patterns on the area A. As a reference technique for explaining the present invention, this method is used in the following.

SUMMARY

As explained in problem 1 referring to FIGS. 10A and 10B, with the dummy pattern arrangement in the related technique 2, it is required to redo the dummy pattern creation each time the layout is corrected. The dummy patterns must be arranged to be separated from a shaped pattern that forms a circuit element by a certain distance. Therefore, it is necessary to rearrange the dummy patterns each time the layout is corrected.

As explained in problem 2 referring to FIG. 11, with the dummy pattern arrangement method in the related technique 2, there is a case that there exists more than two functional blocks created on a chip, and areas A corresponding to the functional blocks are created in the respective functional blocks. In the areas A, the dummy patterns are respectively created, which have a same arrangement with each other. In such a case, it is required to insert the dummy pattern in the hierarchical level in which the area A is formed and correct the hierarchical structure of data after the creation of the dummy pattern, and subsequent processes is required to be redone.

As explained in problem 3 referring to FIGS. 12A and 12B, with the dummy pattern arrangement in the related technique 2, it is required to create the dummy pattern in the area A at the stage of layout creation. Therefore, the amount of the GDS data being managed by a person in charge of the layout increases. If the amount of the GDS data increases, not only verification TAT (Turn Around Time) increases, but also a large amount of design environment area is required.

In order to solve any of the problems 1, 2, and 3, it is desired to make it possible to create a dummy pattern on an area A in the EB operation after 1-chip layout process. Namely, it is desired to make it possible to create same dummy pattern arrangements in a plurality of areas A respectively, independently of the position or the orientation of the areas A.

In a first aspect of the present invention, a dummy pattern arrangement apparatus includes: a recognition layer insertion section configured to insert a plurality of recognition layers, each of the plurality of recognition layers covers a specific area on a chip area layout; a dummy pattern arrangement section configured to designate a specific position of each of the plurality of recognition layers as a dummy pattern creation starting point, and create a dummy pattern on the specific area from the dummy pattern creation starting point in EB data (Electron Beam Exposure Data).

When the specific area exists in the position where a discrete element is arranged, it is possible to insert the recognition layer in the position of the discrete element after data of the discrete element is created. Similarly, when the specific area exists in the position where a functional block is arranged, the recognition layer may be inserted in the position of the functional block after data of the functional block is created. Also, the recognition layer may be inserted in the position of the discrete element or the functional block after 1-chip layout is created. In short, actually, the recognition layer can be inserted in an arbitrary stage of a layout process.

By fixing the dummy pattern creation starting point to the area A, it becomes possible to create the dummy pattern arrangements with the identical shape in the respective areas A by the EB operation. Moreover, even in the case where the areas A are arranged so as to have a certain angle to each other, by providing the algorithm that can fix the dummy pattern creation starting point, the identical dummy pattern is arranged in the respective areas A when the areas A are respectively arranged by arbitrary angles.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 8 is an explanatory plan view 4 for explaining a problem in the case that a layout flow in the related technique 1 is adopted;

DESCRIPTION OF THE PREFERRED EMBODIMENTS

Hereinafter, an apparatus and a method for dummy pattern arrangement according to embodiments of the present invention will be described with reference to the attached drawings.

Here, explanations of configurations and operations similar to those of the foregoing description (in description of the background art and summary of the invention) are abbreviated below.

Figure 9A:
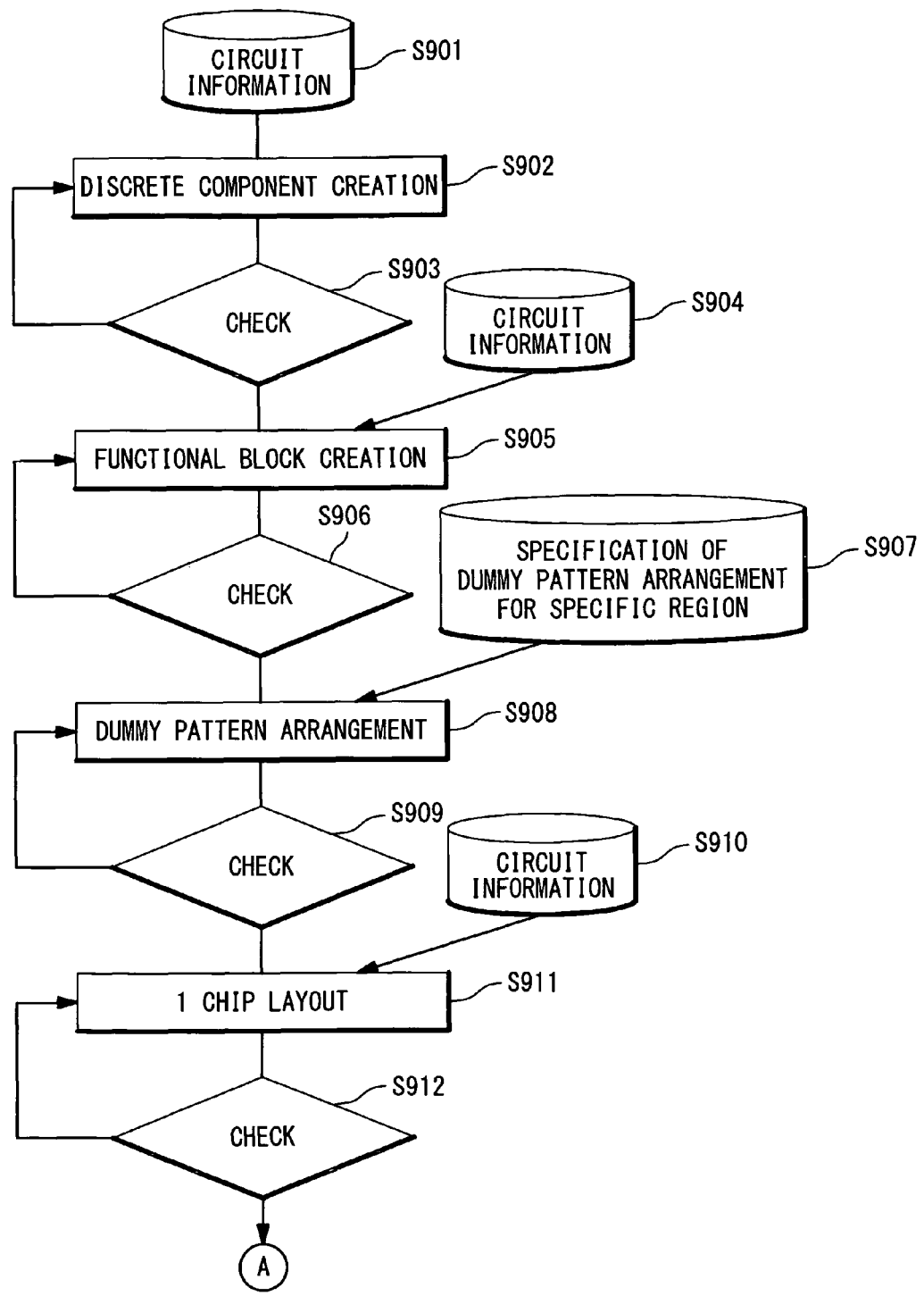
FIG. 9A is a layout flow of a related technique 2 for avoiding the problem 1 in the related technique 1.
Figure 9B:
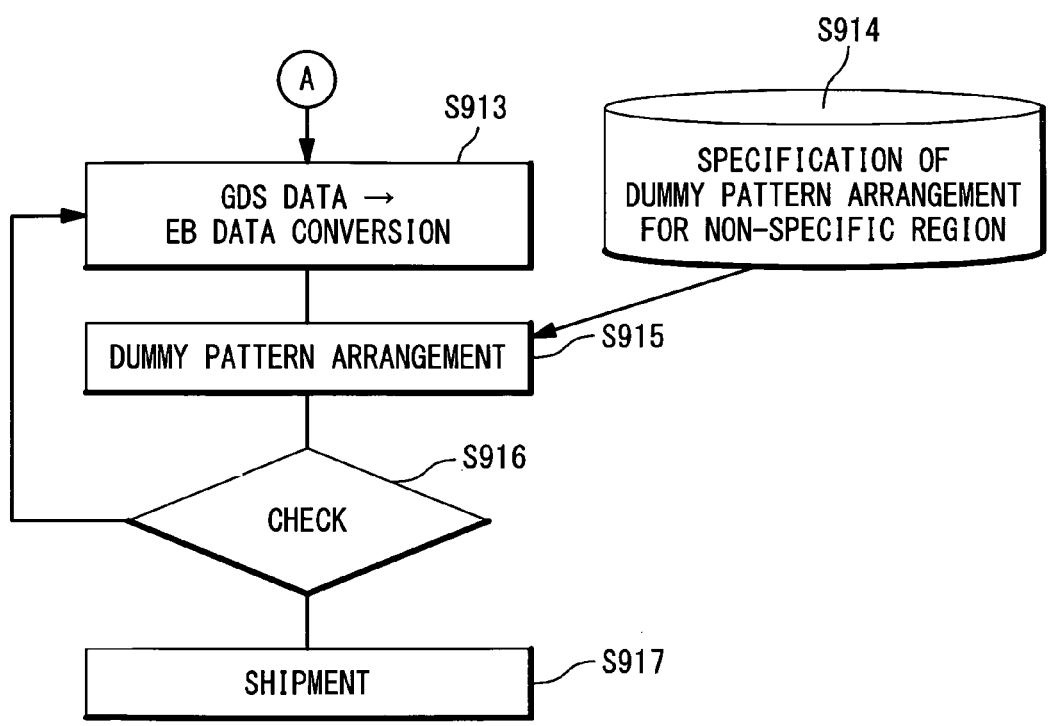
FIG. 9B is a layout flow of the related technique 2 for avoiding the problem 1 in the related technique 2.
Figure 13A:
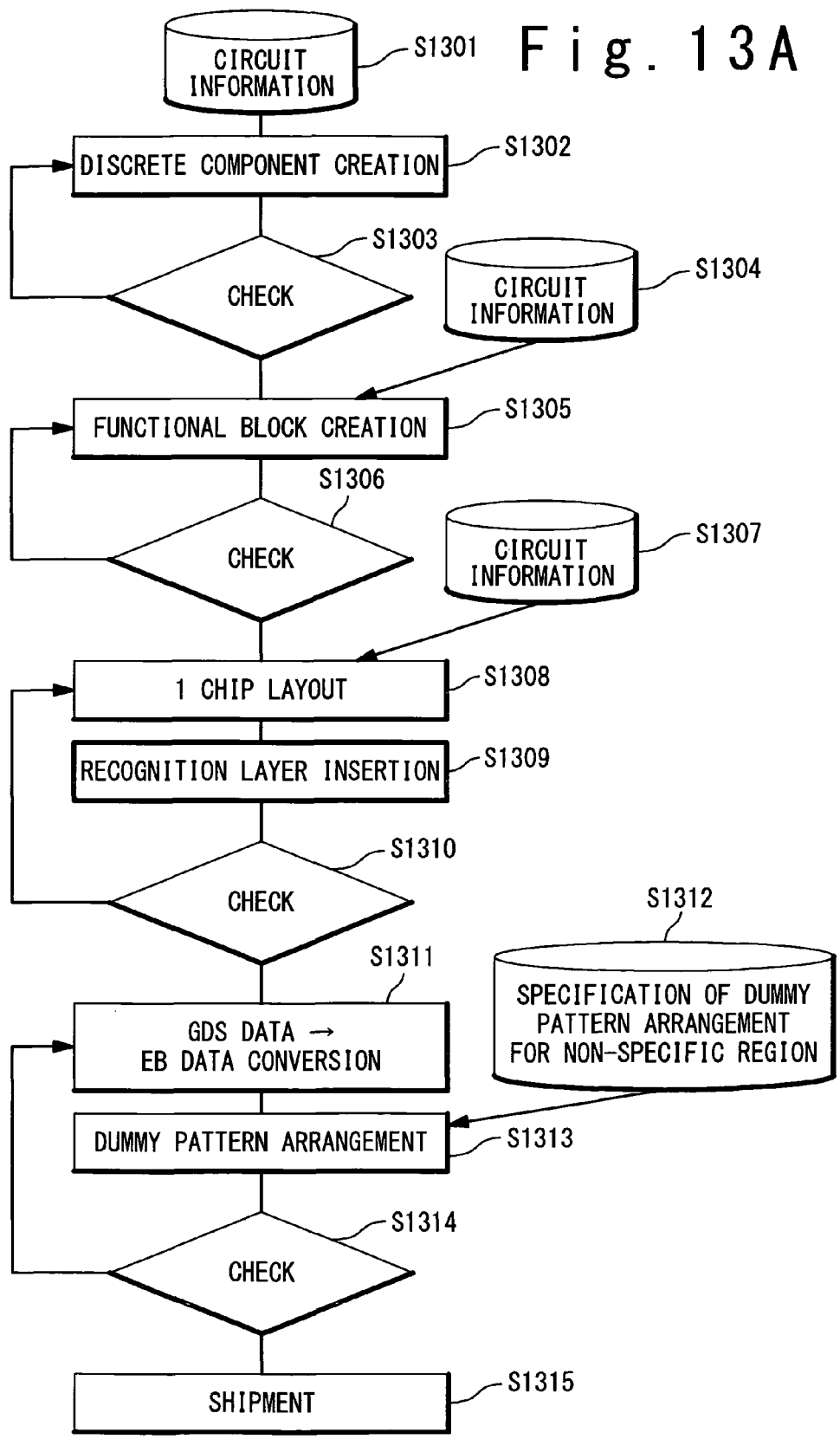
FIG. 13A is a layout flow of a first embodiment.

FIG. 13A shows a layout flow according to a first embodiment of the present invention. The layout flow of FIG. 13A is based on FIGS. 9A and 9B. Comparing to the FIGS. 9A and 9B, the step S907, step S908 and step S909 do not exist, and the step S1309 is added in the FIG. 13A. Further, a dummy pattern arrangement performed after the GDS data to EB data conversion performed for non-specific region in the FIGS. 9A and 9B (steps S914, S915) is changed to be performed for the whole layout in this embodiment (steps S1312, S1313). That is, in a flow of this embodiment, the dummy pattern arrangement is performed only in the dummy pattern arrangement process (step S1313) being a final process of processing GDS format data.

Details of the flow are shown below.

(1) Step S1301

Circuit information for creating discrete components is referred to.

(2) Step S1302

The discrete component data indicating the discrete components on a layout is created based on the circuit information for creating discrete components.

(3) Step S1303

It is judged by checking whether there is any problem in the shapes of the discrete components based on the discrete component data. If there is any problem in the shape of the discrete components, the discrete component data is re-created.

(4) Step S1304

If there is no problem in the shape of the discrete components, circuit information for creating functional block data is referred to.

(5) Step S1305

The functional block data indication the functional blocks on a layout is created based on the circuit information for creating the functional blocks in a functional block data creation process.

(6) Step S1306

It is judged by checking whether there is any problem in the shapes of the functional blocks based on the created functional block data. If there is any problem in the shapes of the functional blocks, the flow returns to the functional block data creation process, and the functional block data is re-created.

(7) Step S1307

If there is no problem in the shapes of the functional blocks, the circuit information for creating a 1-chip layout is referred to.

(8) Step S1308

The 1-chip layout data indicating a layout of 1-chip is created based on the circuit information for creating the 1-chip layout in the 1-chip layout process.

(9) Step S1309

After the 1-chip layout process, a recognition layer for creating a dummy pattern is inserted on the area A in the recognition-layer insertion process. The area A and an area outside the area A are distinguished by covering the area A with the recognition layer, EB operations for the respective areas are specified, and dummy pattern creation in the both areas are realized on the EB data.

(10) Step S1310

Then, it is judged by checking whether there is any problem in the shape of the 1-chip layout based on the created 1-chip layout data. If there is any problem in the shape of the 1-chip layout, the flow returns to the 1-chip layout process and the 1-chip layout is re-created.

(11) Step S1311

If there is no problem in the shape of the 1-chip layout, the created GDS data is converted into the EB data in the GDS data to EB data conversion process.

(12) Step S1312

The information of the specification of dummy pattern arrangement is referred to.

(13) Step S1313

The dummy patterns are arranged in the data processed in the GDS data to EB data conversion process based on the information of the specification of dummy pattern arrangement in the dummy pattern arrangement process.

(14) Step S1314

It is judged by checking whether there is any problem in the shape of the dummy pattern based on the created dummy pattern. If there is any problem in the shape of the dummy pattern arrangement, the flow returns to the GDS data to EB data conversion process, the conversion processing is redone and the dummy pattern arrangement is redone similarly with the above-mentioned processing.

(15) Step S1315

If there is no problem in the shape of the dummy pattern, the EB data is shipped in the EB data shipment process.

In order to arrange identical dummy patterns in a plurality of areas A in the flow of FIG. 13A, it is required to differentiate the area A and an area other than the area A and to fix the dummy pattern creation starting point to the area A.

The area A is differentiated from the other area by covering the area A with a recognition layer to which a predetermined algorithm is linked, specifying the portion covered with the recognition layer (recognition layer A) as the area A so as to be differentiated from a portion other than the area A. In the EB operation, the dummy pattern arrangement instruction to the recognition layer A and the dummy pattern arrangement instruction to an area that is not covered with the recognition layer are differently specified. This EB operation and the dummy pattern arrangement instructions are performed in the dummy pattern arrangement process.

The algorithm will be explained below. In order to realize the flow of FIG. 13A, it is required to fix the dummy pattern creation starting point to the area A for issuing an instruction to arrange an identical dummy pattern on the respective areas A in the EB operation. That is, it is necessary to fix the dummy pattern creation starting point to the lower-left point of each of the individual areas A.

Figure 13B:
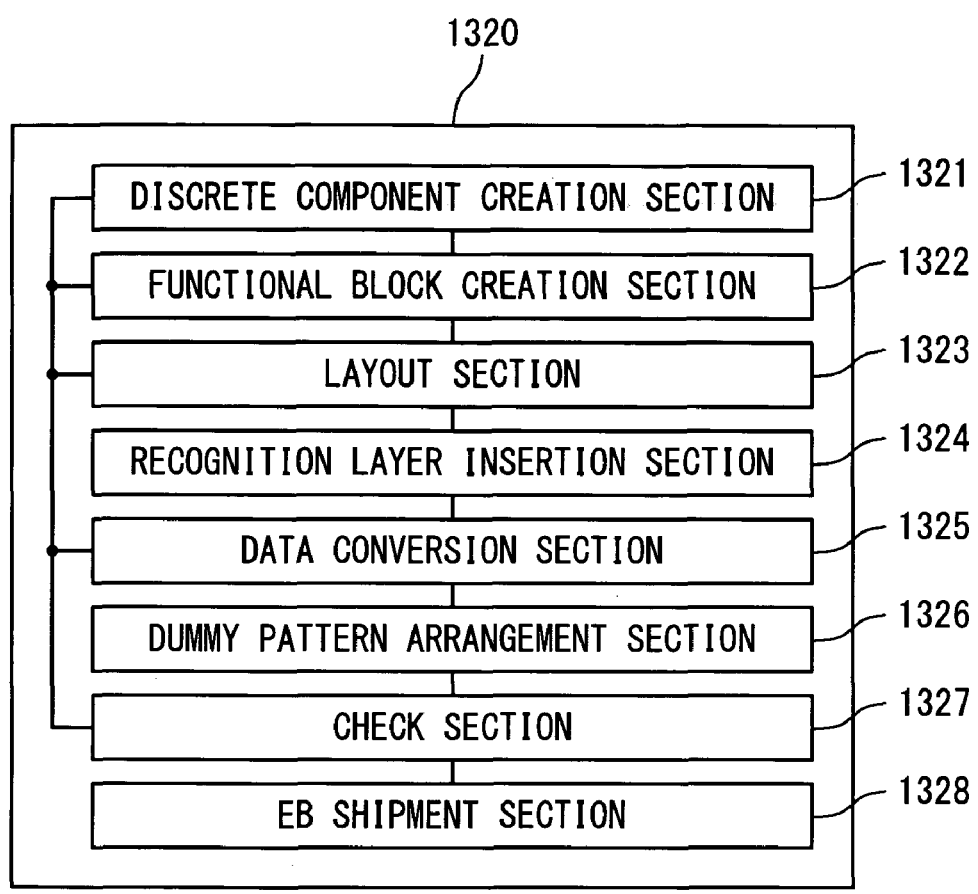
FIG. 13B is a conceptual block diagram of a dummy pattern arrangement apparatus for performing the layout flow of a first embodiment.

FIG. 13B shows a conceptual block diagram of a dummy pattern arrangement apparatus of this embodiment for performing the layout flow of FIG. 13A.

A dummy pattern arrangement apparatus 1320 of this embodiment has a discrete component creation section 1321, a functional block creation section 1322, a layout section 1323, a recognition layer insertion section 1324, a data conversion section 1325, a dummy pattern arrangement section 1326, a check section 1327, and an EB shipment section 1328.

The discrete component creation section 1321 performs the discrete component creation process. That is, the discrete component creation section 1321 refers to circuit information for creating the discrete components, and creates the discrete component data indicating the discrete components on a layout based on the circuit information for creating the discrete components.

The functional block creation section 1322 performs the functional block data creation process. That is, the functional block creation section 1322 refers to circuit information for creating the functional block data indicating the functional blocks on a layout, and creates the functional block data based on the circuit information for creating the functional block.

The layout section 1323 performs the 1-chip layout process. That is, the layout section 1323 refers to circuit information for creating the 1-chip layout, and creates the 1-chip layout based on the circuit information for creating the 1-chip layout. The recognition layer insertion section 1324 performs a recognition-layer insertion process. That is, the recognition layer insertion section 1324 inserts the recognition layer for dummy pattern creation into the area A (specific area).

The data conversion section 1325 performs the GDS Data to EB data conversion process. That is, it converts GDS data into EB data.

The dummy pattern arrangement section 1326 performs the dummy pattern arrangement process. That is, it refers to information of the specification of dummy pattern arrangement, and arranges the dummy patterns based on the information of the specification of dummy pattern arrangement based on the data being processed in the GDS data to EB data conversion process.

The check section 1327 checks each operation process. If there is any problem, the flow returns to a required working process, and the working process is performed again. Incidentally, the check section 1327 may be contained in each component section in the dummy pattern arrangement apparatus which outputs data to which checking process is applied.

The EB shipment section 1328 outputs the EB data which is a result of the layout creation process in a form available for shipment. Depending of the circumstances, the shipment section 1328 may be eliminated.

In the following explanation, the "lower-left point of an area A from the internal viewpoint of the area A" means that, when a certain edge of the shape of an area A, for example a longer side of a rectangular area A is defined as the lower edge of the area A, the left edge of the longer side is defined as the lower-left point of the area A from the internal viewpoint of the area A. On the contrary, the "lower-left point of an area A in a layout" or merely the "lower-left point of an area A" means that, when a certain edge of a layout is defined as a lower side, the left side of the edge of the area A nearest to the lower side of the layout.

Figure 14:
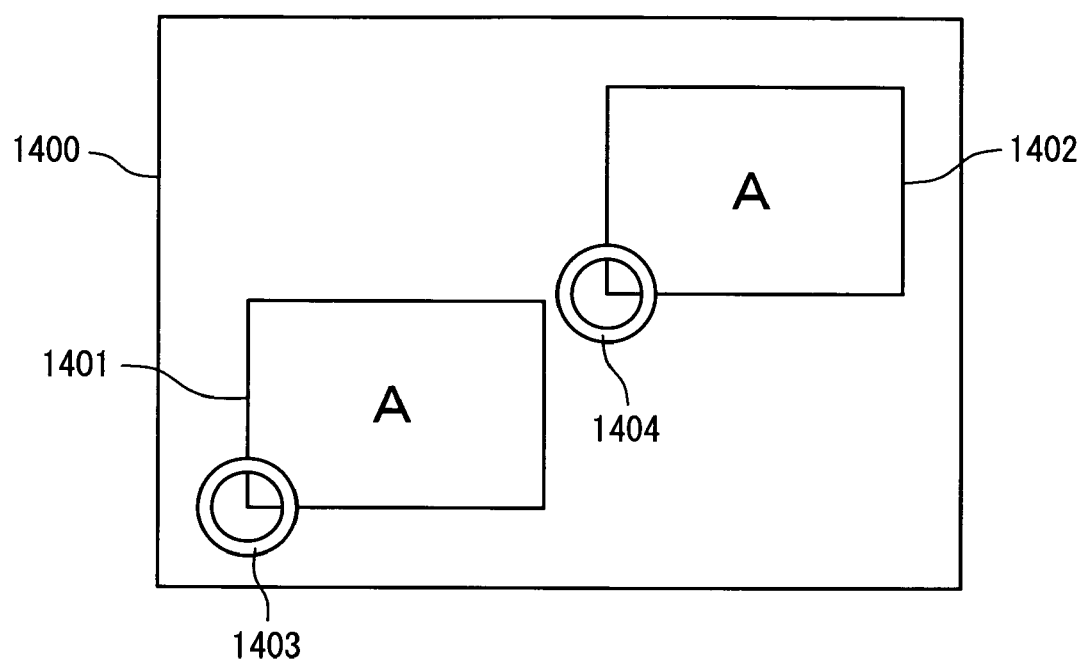
FIG. 14 is a plan view 1 of a method for calculating a recognition layer.

In the case shown in FIG. 14, a chip area 1400 includes an area A 1401 and an area A 1402.

In a case where a plurality of areas A (the area A 1401 and the area A 1402) area having a same shape are arranged in a same orientation on a chip area 1400 as shown in FIG. 14, a creation starting point 1403 and a creation starting point 1404, which are the creation starting points of the respective dummy patterns, are required to be fixed for the area A 1401 and the area A 1402, respectively.

Figure 15:
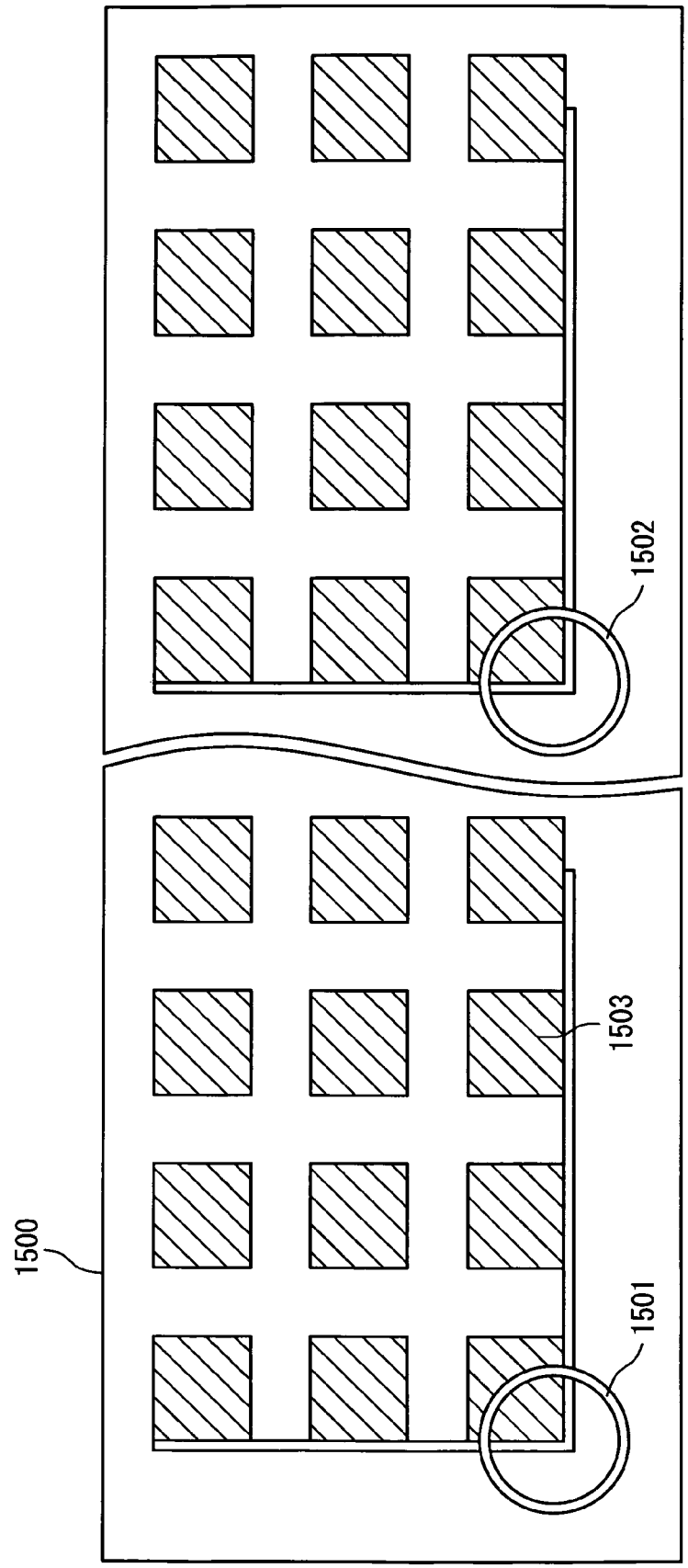
FIG. 15 is a plan view 2 for explaining a method for calculating a recognition layer.

In FIG. 15, the chip area 1500 corresponds to the chip area 1400 in FIG. 14. If corner points 1501 and 1502 of FIG. 15 are set to be the dummy pattern creation starting points in the areas A (the area A 1401 and the area A 1402), respectively, it is possible to arrange the dummy pattern 1503 in the area A 1401 and the dummy pattern 1503 in the area A 1402 to be same with each other.

Figure 16:
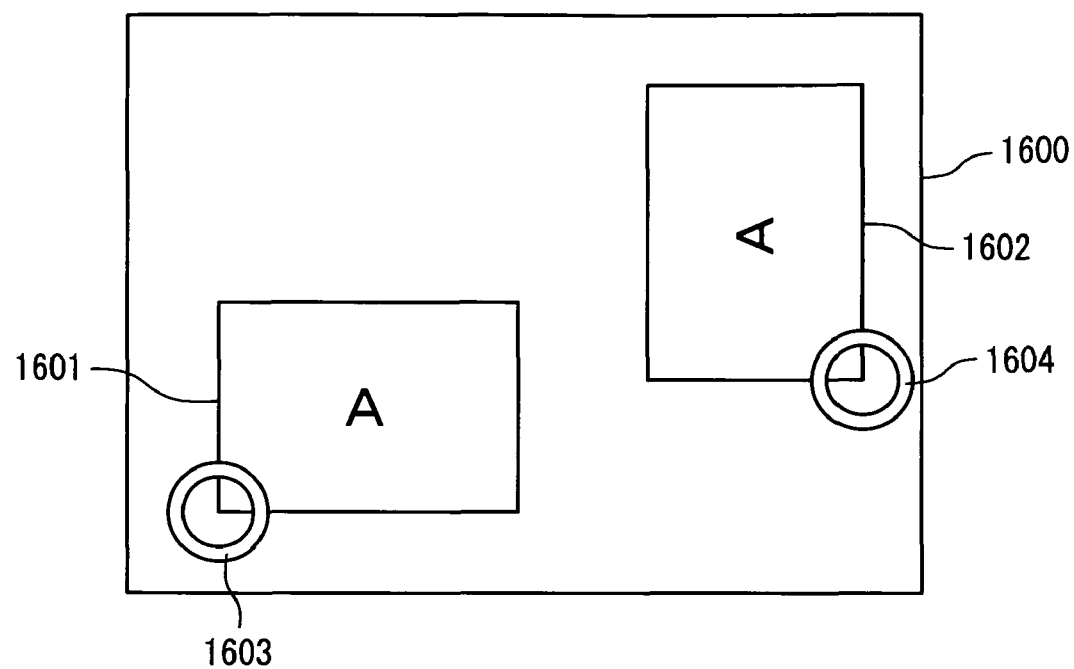
FIG. 16 is a plan view 3 for explaining a method for calculating a recognition layers.

Moreover, in a case shown in FIG. 16, in the chip area 1600, an area A 1601 and another area A 1602 which have a same shape is arranged so that their orientations are different from one another. Namely, the area A 1602 is rotated compared with the area A 1601. In this case, for arranging a same dummy pattern on the area A 1601 and the area A 1602, it is required to designate a creation starting point 1603, 1604 which are the dummy pattern creation starting points at a same position from the internal viewpoint of each of the areas A 1601, 1602. Namely, the lower-left corners from the internal viewpoint of the respective areas A 1601, 1602 are required to be designated as the dummy pattern creation starting points, which are positioned at same direction in the corresponding areas A on the layout.

Figure 17:
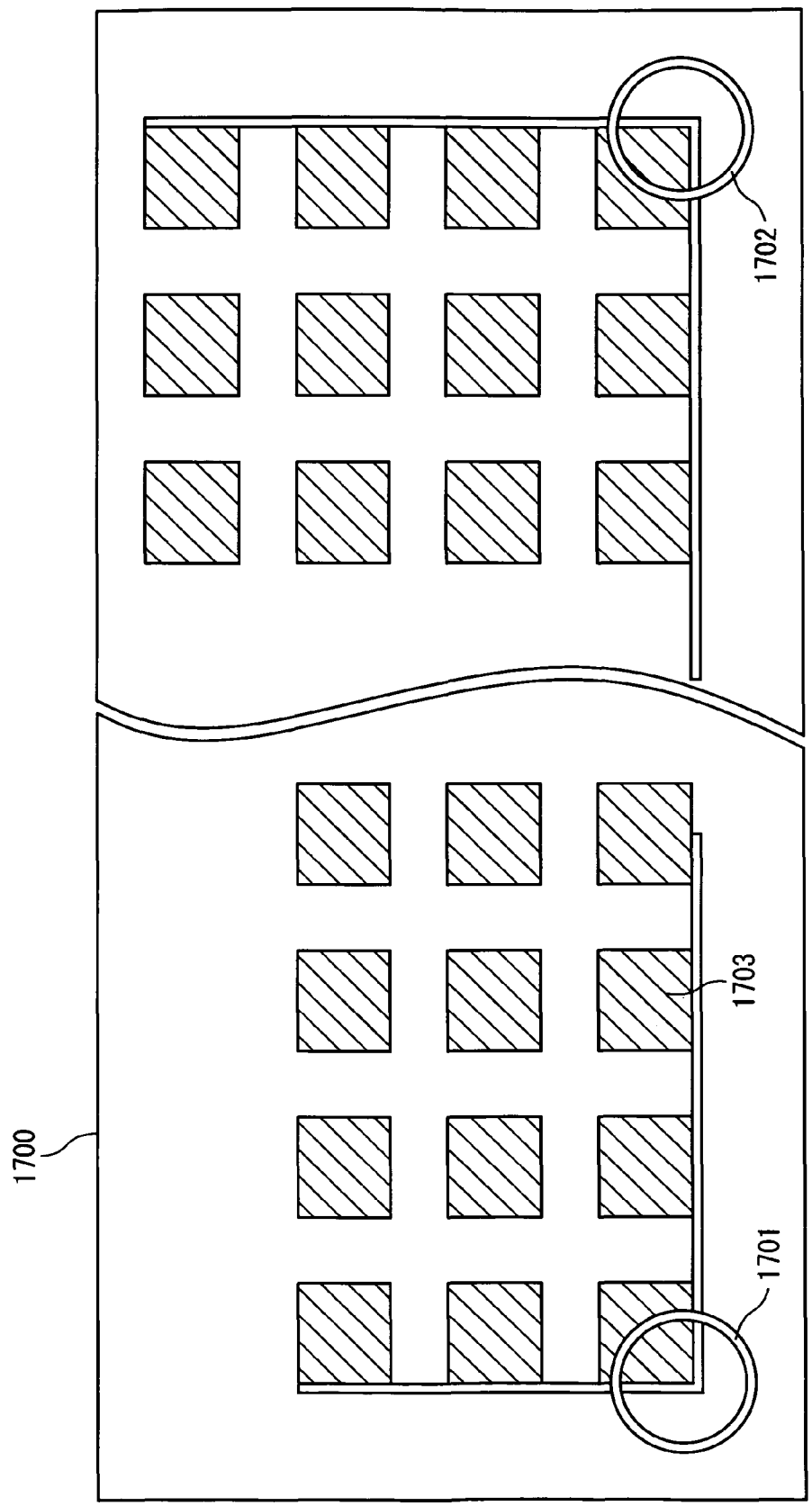
FIG. 17 is a plan view 4 for explaining a method for calculating a recognition layer.

In FIG. 17, the chip area 1700 corresponds to the chip area 1600 shown in FIG. 16. If the creation starting point 1603 and the creation starting point 1604 of FIG. 16 (i.e., a creation starting point 1701 and a creation starting point 1702 shown in FIG. 17) are specified as the creation starting points, dummy patterns 1703 on the respective areas A arranged in a same manner.

Figure 1A:
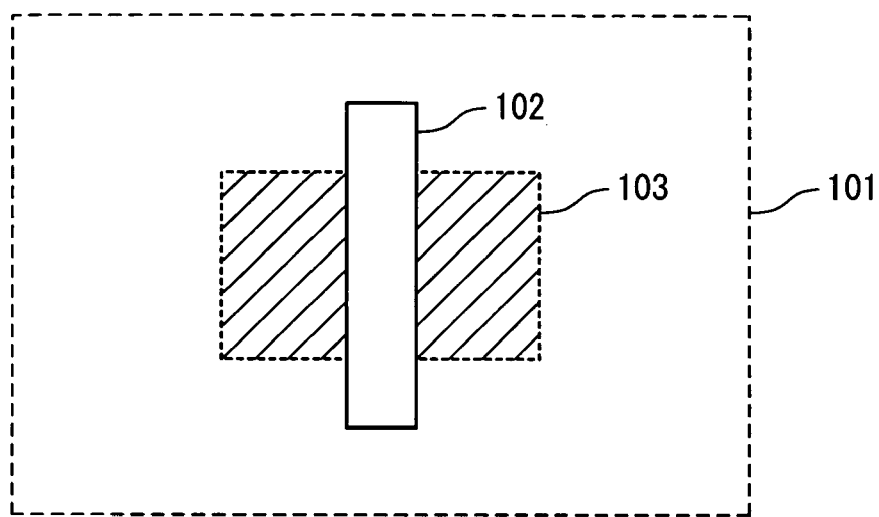
FIG. 1A is a plan view for explaining a meaning of the dummy pattern.
Figure 1B:
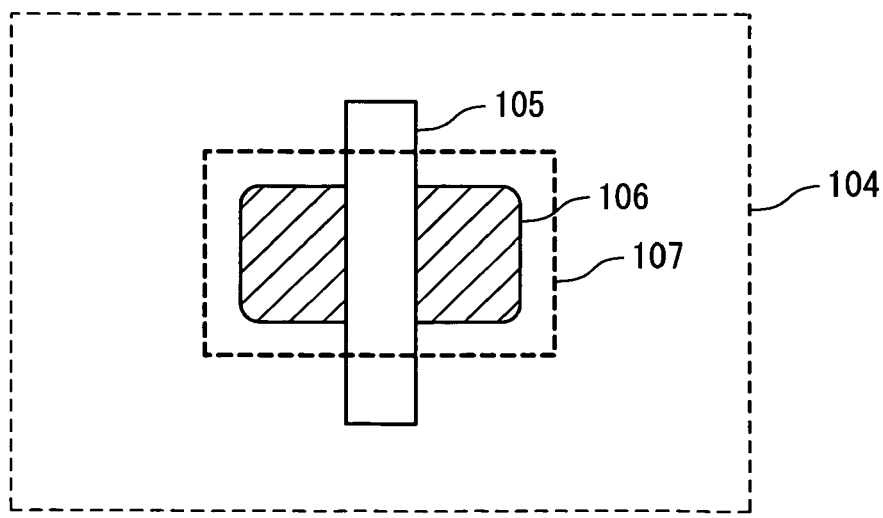
FIG. 1B is a plan view for explaining a meaning of the dummy pattern.
Figure 1C:
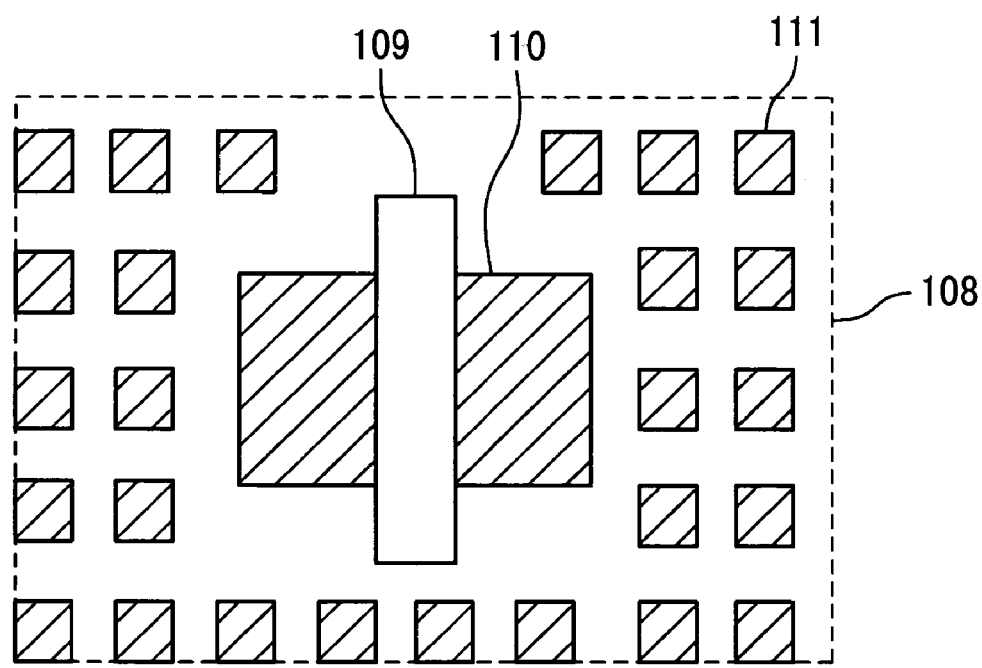
FIG. 1C is a plan view for explaining a meaning of the dummy pattern.
Figure 2:
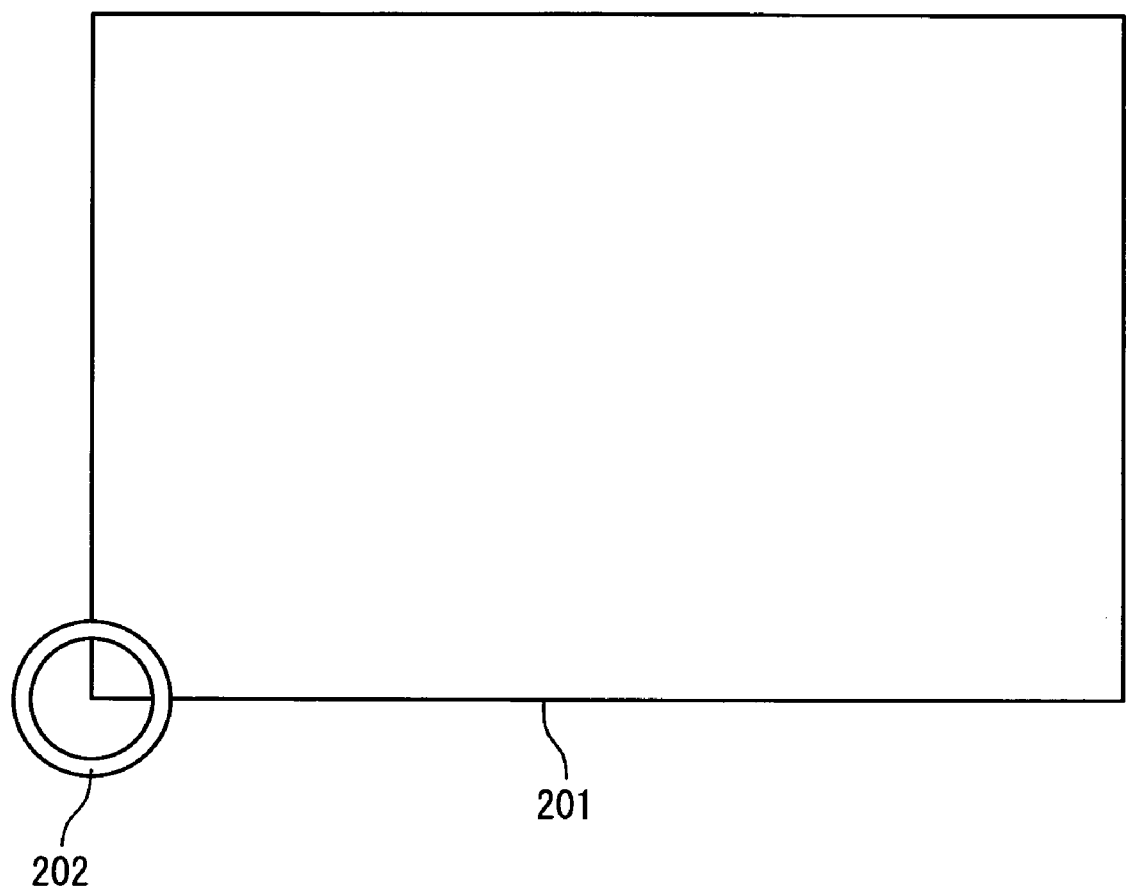
FIG. 2 is a plan view for explaining a dummy pattern arrangement starting point in a case of using the EB operation.
Figure 3:
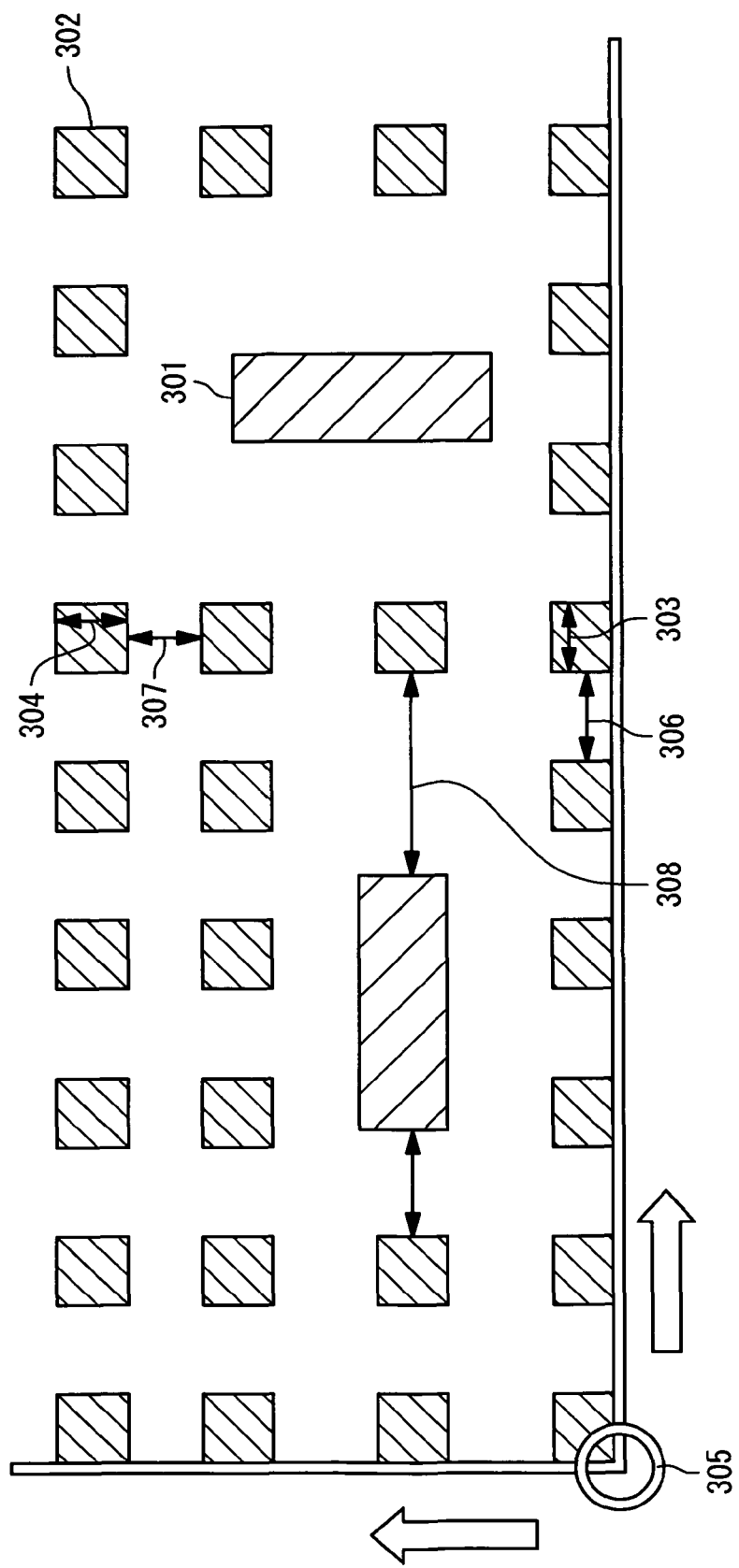
FIG. 3 is a plan view for explaining a dummy pattern arrangement in a common EB operation.
Figure 4A:
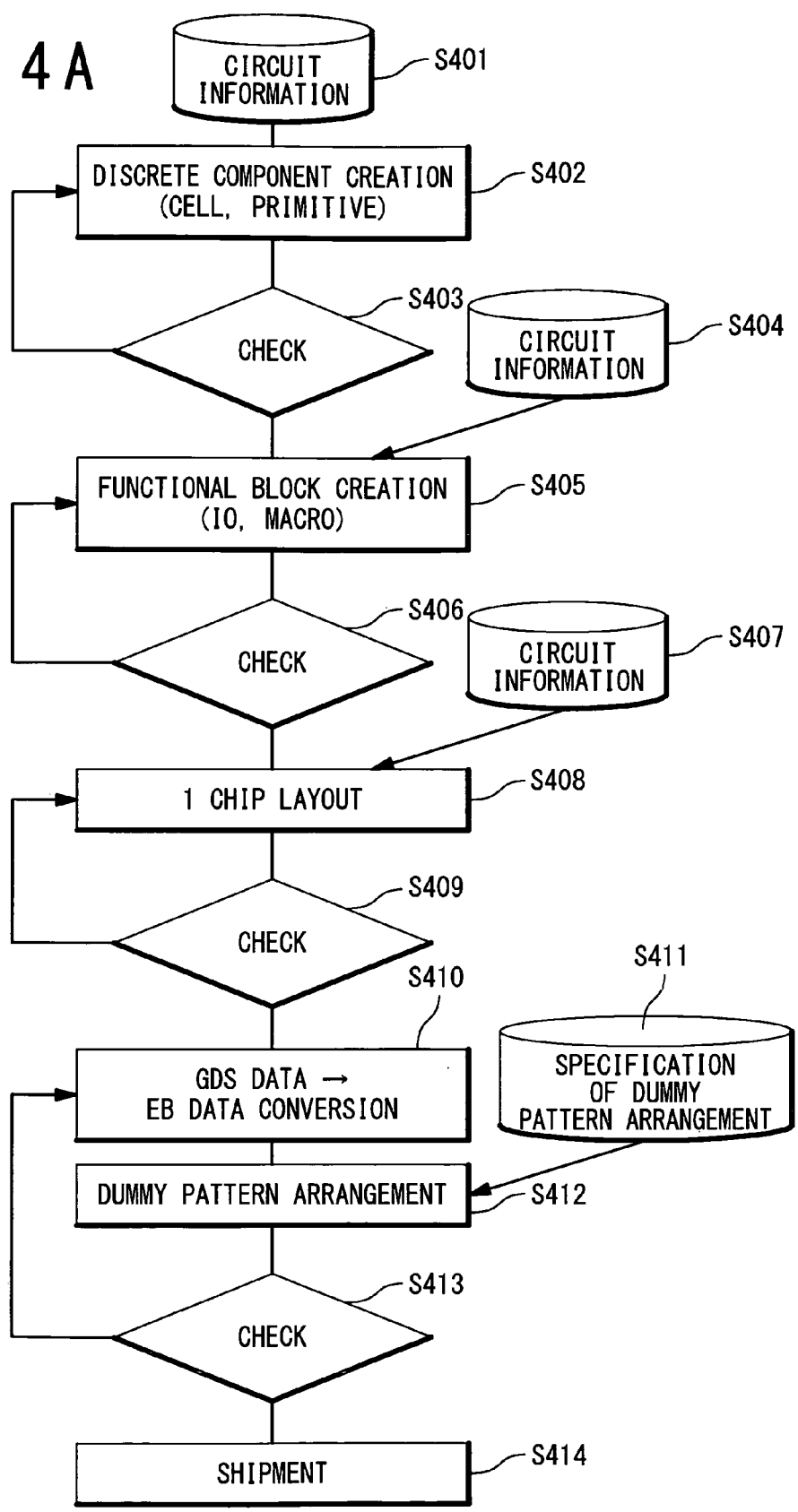
FIG. 4A is a layout flow in a related technique 1.
Figure 4B:
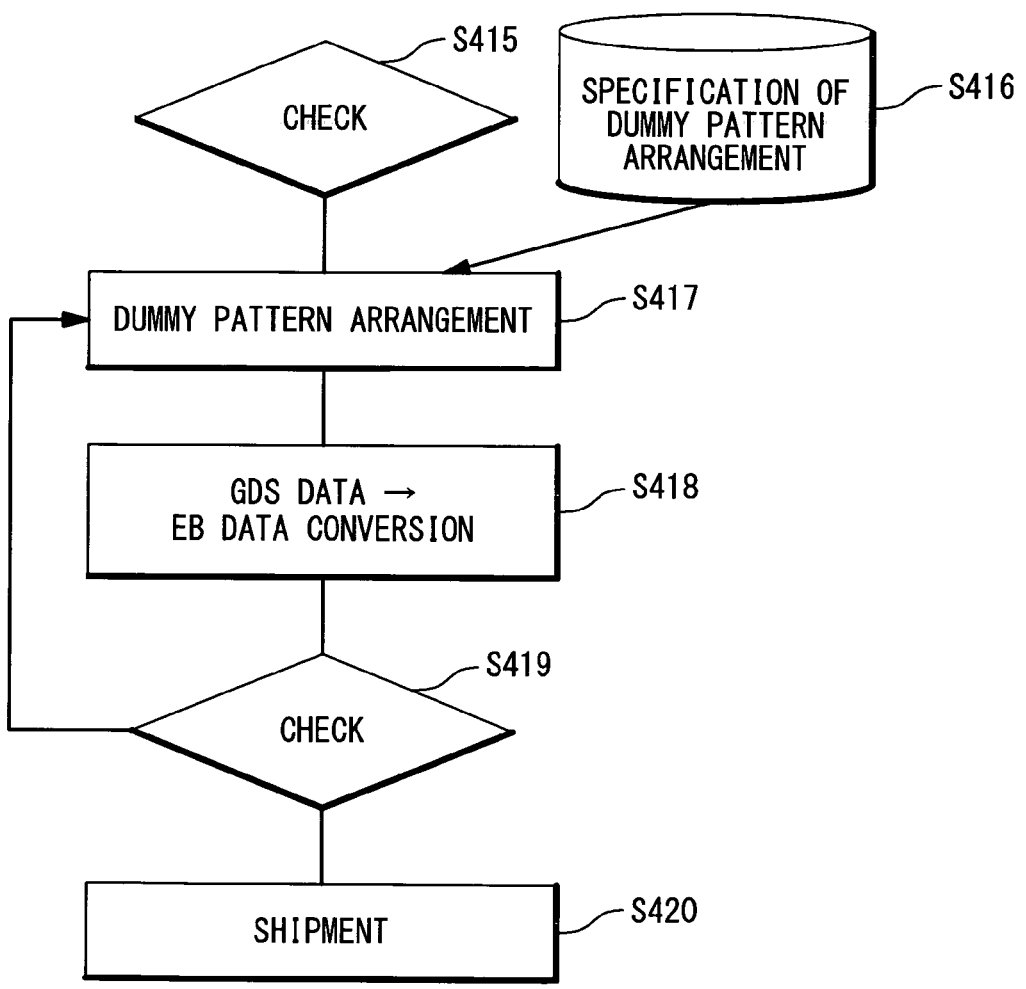
FIG. 4B is a layout flow in the related technique 1.
Figure 5:
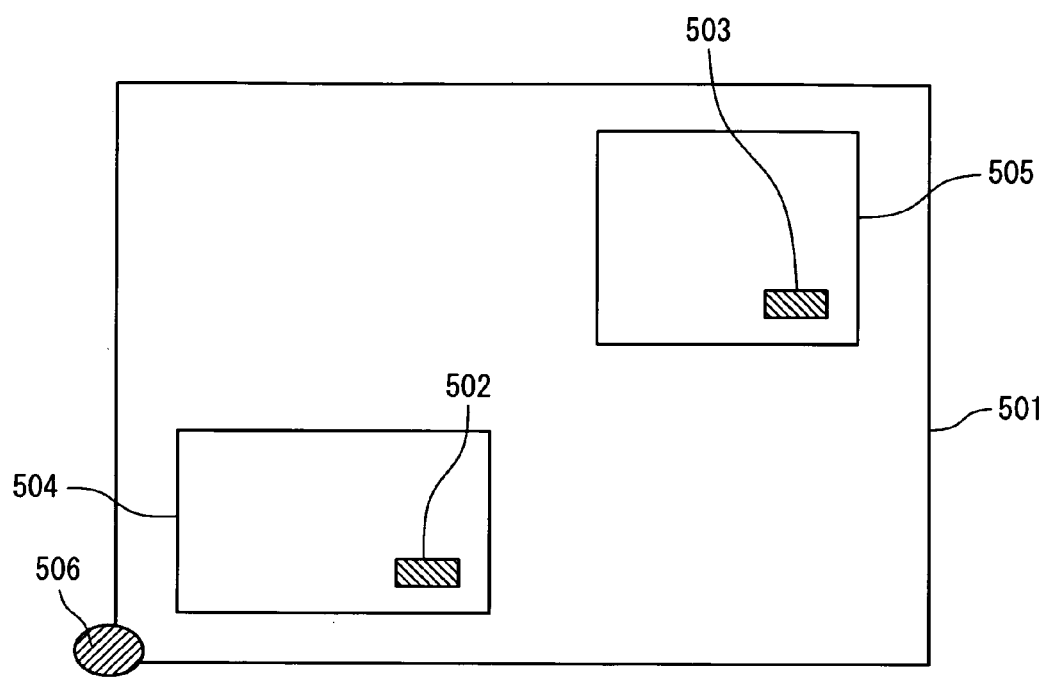
FIG. 5 is an explanatory plan view 1 for explaining a problem in the case that a layout flow in the related technique 1 is adopted.
Figure 6:
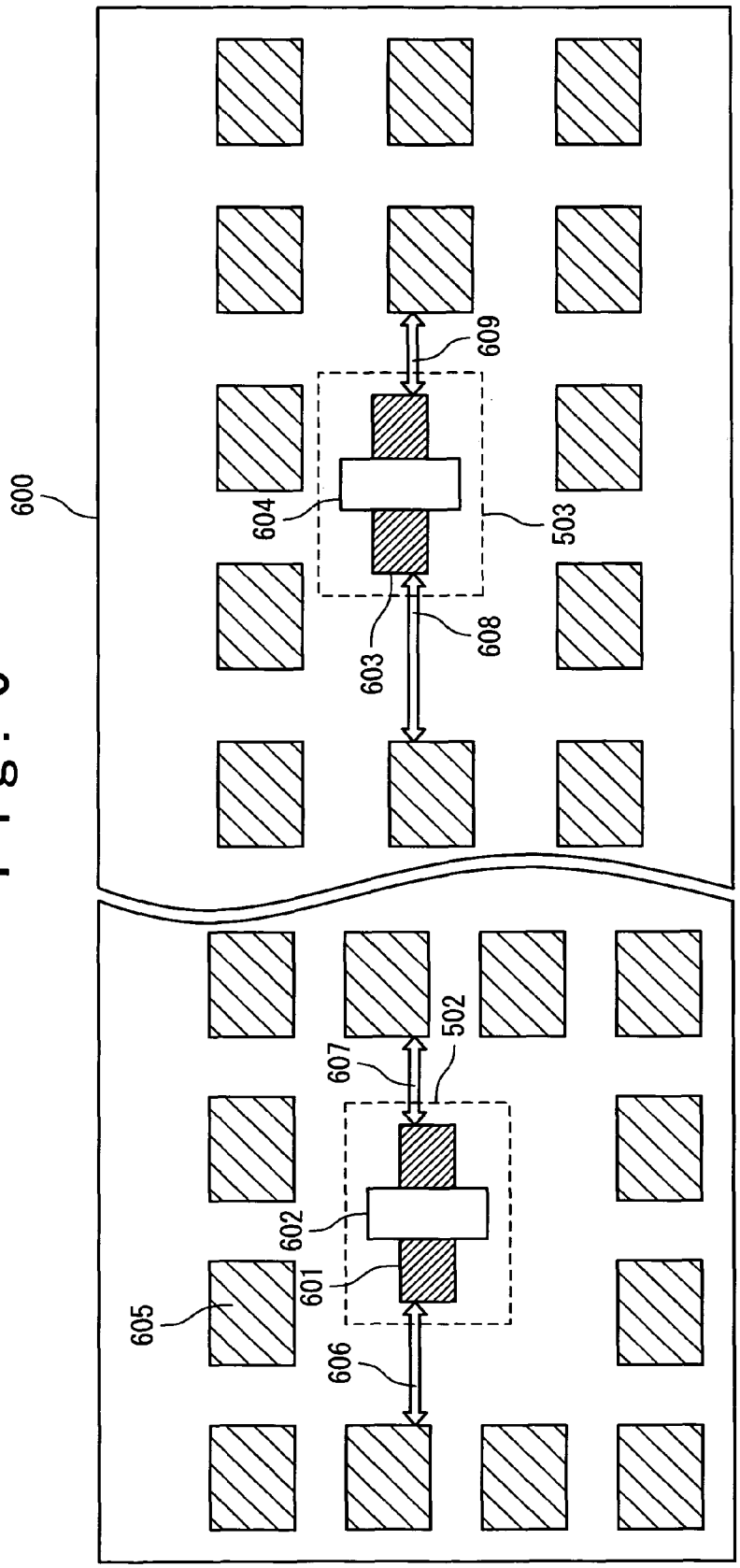
FIG. 6 is an explanatory plan view 2 for explaining a problem in the case that a layout flow in the related technique 1 is adopted.
Figure 7:
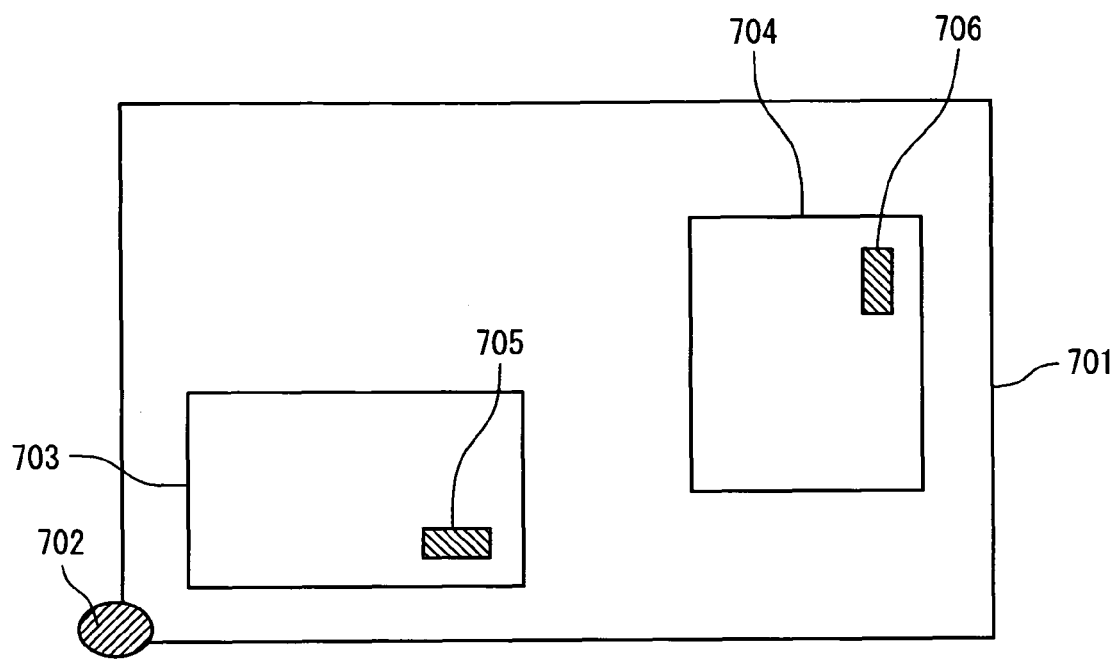
FIG. 7 is an explanatory plan view 3 for explaining a problem in the case that a layout flow in the related technique 1 is adopted.

However, the dummy pattern creation specification by the EB operation is done as explained referring to FIG. 3. That is, the X-direction size 303 and the Y-direction size 304 of each dummy pattern element included in the dummy pattern are designated, and the lower-left point 305 of the layout data in which the dummy pattern is arranged is designated as the starting point, and the X-direction arrangement gap 306 and the Y-direction arrangement gap 307 which are intervals between adjacent dummy pattern elements aligned in a constant pitch are designated.

In a case where the X-direction arrangement gap 306 and the Y-direction arrangement gap 307 are specified to the area A 1601 whose orientation is defined to be not rotated, in order to generate the identical dummy patterns to areas A having different rotation angles on a layout, it is required to issue an instruction to the area A 1603 so that the X-direction arrangement gap 306 may be arranged in a negative direction.

That is, the EB operation to the area A 1601 and that to the area A 1602 are different. However, it is impossible to process only the area A 1602 which is arranged in a rotated orientation compared with the area A 1601 by a different EB operation.

Therefore, the dummy pattern creation starting point is required to be the lower-left point of the area A in a layout regardless of the rotation angle of each area A.

That is, independently of the rotation angle of the area A (namely, for the both cases where the lower-left point of the area A in the layout that was rotated is set as the dummy pattern creation starting point and where the lower-left point of the area A in the layout that was not rotated is set as the dummy pattern creation starting point), recognition layers are created and inserted in respective areas A, on which the same dummy pattern is created for the plurality of areas A having different rotation angles. The lower-left point of areas A in the layout is specified as the dummy pattern creation starting point.

Figure 18:
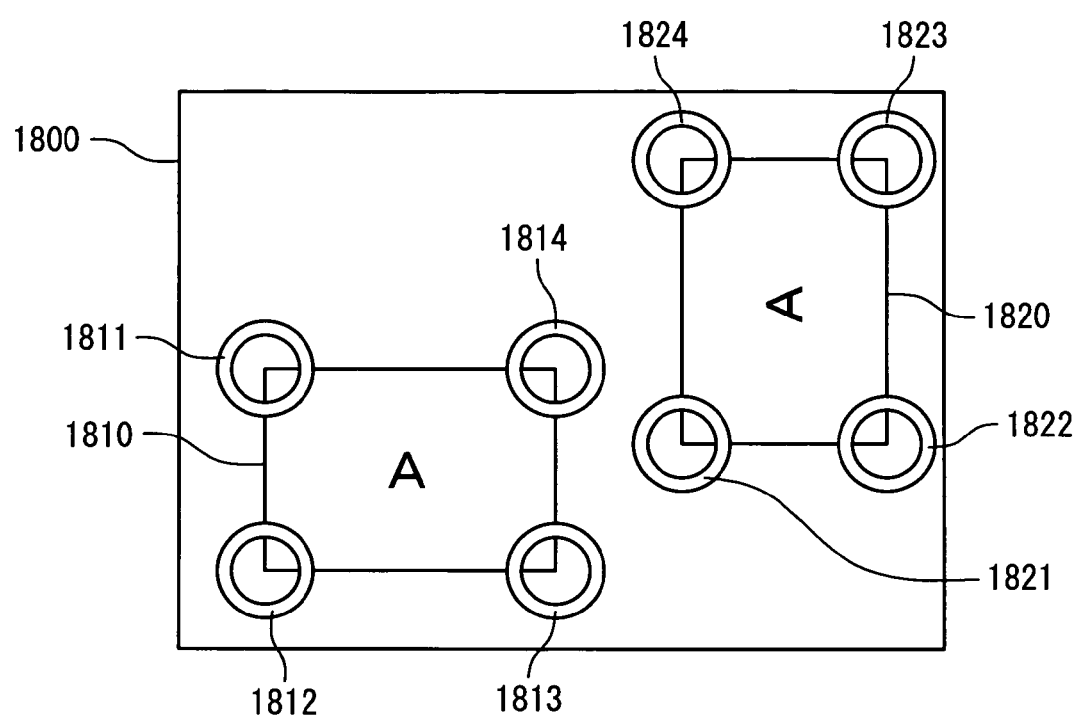
FIG. 18 is a plan view 5 for explaining a method for calculating a recognition layer.

In the chip area 1800 of FIG. 18, there exist an area A 1810 which is not rotated by definition and an area A 1820 which is rotated compared with the area A 1810. There are points 1811, 1812, 1813 and 1814 in four corners of the area A 1810. There are points 1821, 1822, 1823 and 1824 in four corners of the area A 1820.

For creating same dummy pattern on an area A regardless of the rotation angle of the area A, the following process is performed. The recognition layer is created so that any corner point (point 1811, 1812, 1813, 1814, 1821, 1822, 1823 or 1824) can be designated as the dummy pattern creation starting point. The created recognition layer is arranged to cover each of the areas A 1810 and 1820. The lower-left point in the layout is designated as the dummy pattern creation starting point of EB operation for each of the recognition layers.

Figure 19:
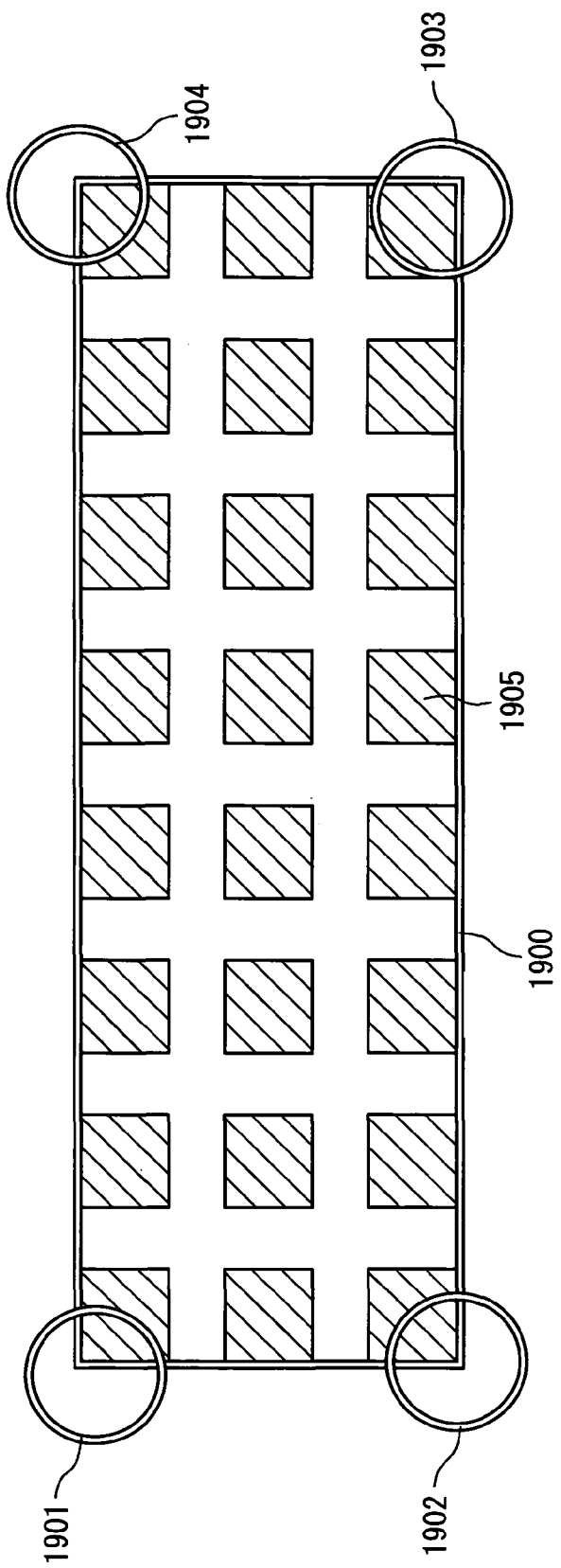
FIG. 19 is a plan view 6 for explaining a method for calculating a recognition layer.

FIG. 19 shows an example of the recognition layer.

The recognition layer is such that even when any of the four corners (a point 1901, a point 1902, a point 1903, and a point 1904) of a recognition layer 1900 is designated to be the creation starting points of dummy patterns 1905, the arrangement of the identical dummy patterns is made possible. The positions of the recognition layers are determined so that they are positioned in a same distance from and a same direction to the corresponding areas A in which the respective dummy patterns are intended to have the same arrangement. Moreover, the recognition layer is only required to cover the area A with sizes that are obtained by adoption of an algorithm shown below.

Incidentally, although the recognition-layer insertion process is inserted in the step S1309 in the flow of FIG. 13A, if the area A exists for a discrete component, the recognition layer can be inserted for the discrete component after the discrete component creation process (step S1302). Similarly, when the area A exists in a functional block, the recognition layer can be inserted into the functional block after the functional block data creation process (step S1305). Moreover, the recognition layer can be inserted for a discrete component or into the functional block after the 1-chip layout process (step S1308). That is, actually, the recognition layer may be inserted at whichever stage of the layout process.

Figure 20:
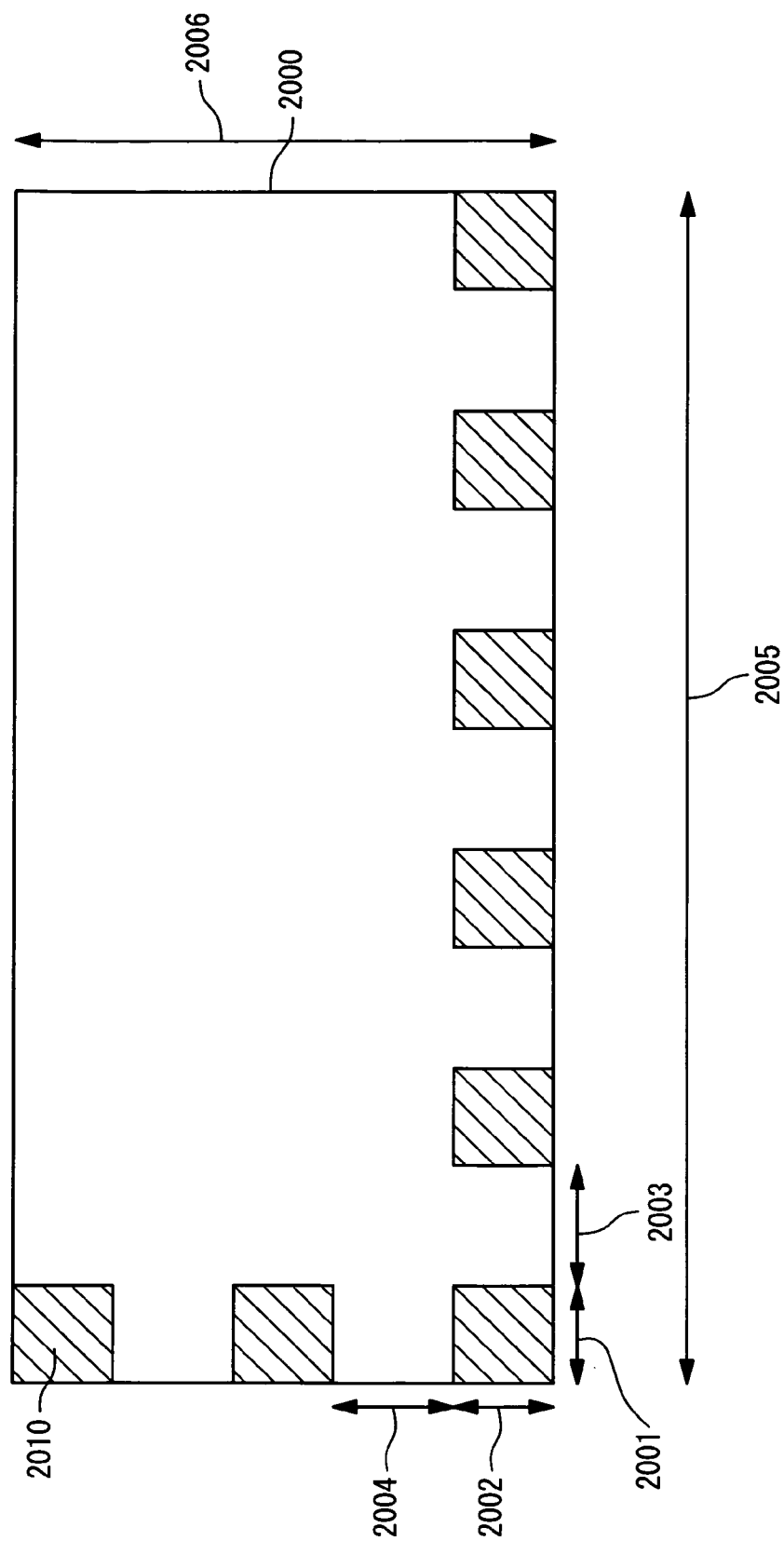
FIG. 20 is a plan view 7 for explaining a method for calculating a recognition layer.

Referring to FIG. 20, a method for calculating the recognition layer A for realizing the processes described above will be described in the following.

Dummy pattern 2010 consisting of a plurality of periodically arranged dummy pattern elements is arranged in a recognition layer A 2000.

(1) The X-direction size 2001 and the Y-direction size 2002 of each of the dummy pattern elements composing the dummy pattern 2010 are same.

(2) The X-direction gap 2003 and the Y-direction gap 2004 of each of the dummy pattern elements are same value.

(3) The X-direction size 2005 and the Y-direction size 2006 of the recognition layer A 2000 are calculated as the following equation.

size of recognition layer $A$=(a multiple of (dummy pattern element size+dummy pattern element gap value))+dummy pattern element size.   [equation]

Here, the multiple is the number of the "combinations of the dummy pattern element and the dummy pattern element gap" for each direction. That is, the multiple is the total number of the dummy pattern elements in each of the X-direction and the Y-direction in the recognition layer A subtracted one.

That is, the size of the recognition layer A is fixed by following equations.

$X$-direction size 2005 of the recognition layer=(a multiple of (the $X$-direction size 2001 of the dummy pattern element+the $X$-direction size 2003 of the dummy pattern element gap))+$X$-direction size 2001 of the dummy pattern element   ($X$-direction)

The $Y$-direction size 2006 of the recognition layer=(a multiple of (the $Y$-direction size 2002 of the dummy pattern element+the $Y$-direction size 2004 of the dummy pattern element gap))+$Y$-direction size 2002 of the dummy pattern element   ($Y$-direction)

More simply, by using the following representation,
DR: each of the X-direction size and the Y-direction size of each dummy pattern element which are demanded to be same;

GAP: each of the gaps (namely, intervals) between the adjacent dummy pattern elements in X-direction and in Y-direction which are demanded to be same;

a, b: positive integers, the x-direction size $X_R$ and the Y-direction size $Y_R$ are represented by the following equation.

$$X_R = a(DP+\text{GAP}) + DP$$

$$Y_R = b(DP+\text{GAP}) + DP$$

By covering the areas A with the respective recognition layers A formed by the above mentioned calculation method, the areas A and an area other than the areas A can be discriminated. Moreover, by setting the lower-left point of the recognition layer A that is covering the area A as the dummy pattern creation starting point, it becomes possible to fix the arrangement of the identical dummy patterns in the area A.

Here, contents of what were described above will be summarized below.

In order to realize the flow shown in FIG. 13A, it is required to fix the dummy pattern creation starting point to each area A. Therefore, the EB data is discriminated into that for the area A and that for other than the area A. The area A is covered with the recognition layer to which a certain algorithm is linked, so that a region covered with the recognition layer (recognition layer A) and the other region are discriminated from each other. What is required to arrange the identical dummy patterns in the areas A is just to unify the dummy pattern creation starting points to the areas A in the layout.

Moreover, also in the case where the areas A are arranged to have different rotation angles, in order to make the dummy pattern arrangements in the respective areas A be the same, it is required to form the recognition layers whereby the identical dummy patterns are arranged even when any one of corner points of each of the areas A is set to be the starting point.

Calculation of the recognition layer that satisfies these requirements needs to fulfill following points.

(1) The X-direction size and the Y direction size of the dummy pattern elements composing the dummy pattern are set to be equal.

(2) The X-direction gap and the Y-direction gap of the dummy pattern elements are set to be equal.

(3) The size of the recognition layer A is calculated by the following equation for both the X-direction and the Y-direction.

Size of recognition layer $A$=(a multiple of (dummy pattern element size+dummy pattern element gap value))+dummy pattern element size. (equation)

Covering each area A with the recognition layer A formed by the above calculation method makes it possible to discriminate the area A and the other area, and the dummy pattern creation starting point can be fixed to each area A.

Figure 21:
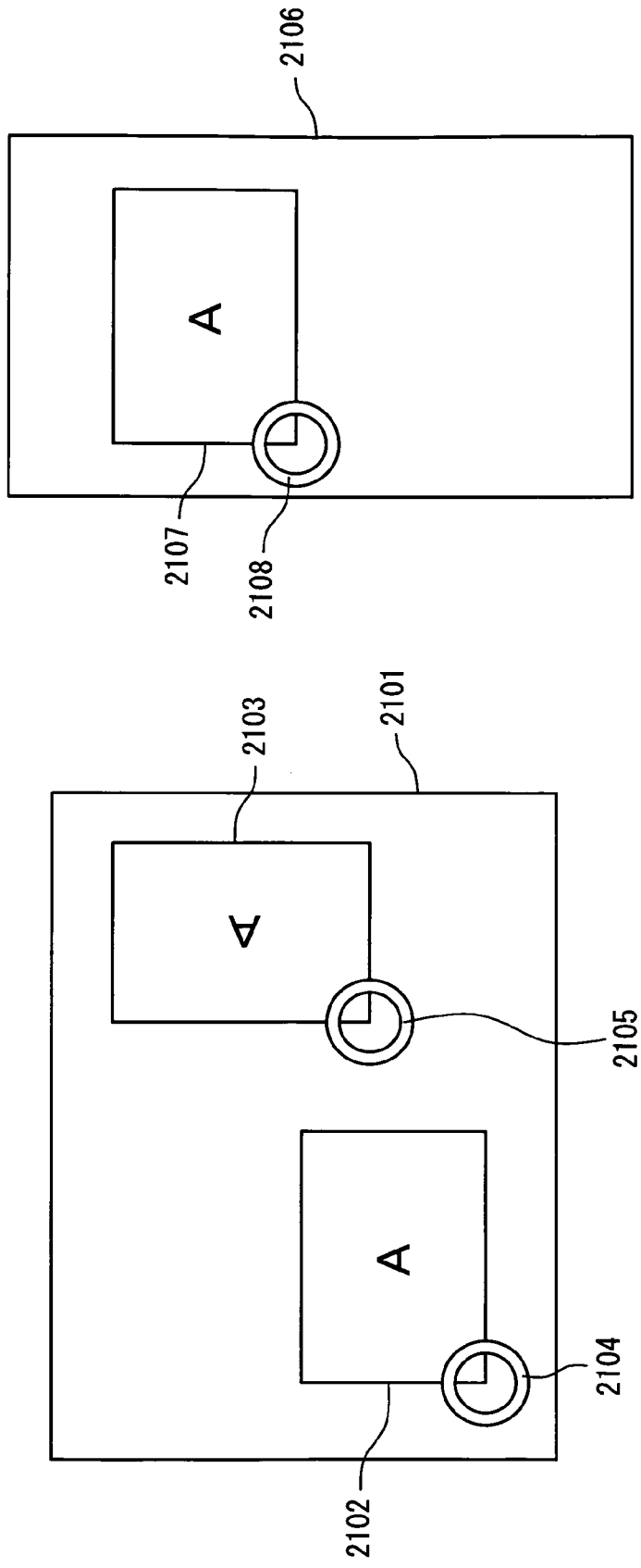
FIG. 21A is a plan view for explaining an arrangement starting point of the recognition layer area by the EB operation.
FIG. 21B is a plan view for explaining an arrangement starting point of the recognition layer area by the EB operation.

Referring to FIG. 21A and FIG. 21B, the area A 2102 and the area A 2103 exist on a chip area 2101. The lower-left point in the layout of the recognition layer A covering the area A 2102 is designated as a point 2104, and the lower-left point in the layout of the recognition layer A covering the area A 2103 is designated as a point 2105. Similarly, the area A 2107 exists in the chip area 2106. The lower-left point in the layout of the recognition layer A covering the area A2107 is designated as the point 2108.

By covering the area A with the recognition layer A and designating the lower-left points in the layout of the respective recognition layers A, i.e., the point 2104, the point 2105, and the point 2108, as the dummy pattern creation starting points, it becomes possible to arrange the dummy patterns of the area A 2102, the area A 2103, and the area A 2107 with the identical shape on the EB data. That is, by covering the area A with the recognition layer A and performing the EB operation, the identical dummy patterns are created in a plurality of areas.

The above-mentioned problem is solved by embodiments of the present invention as follows.

Figure 10A:
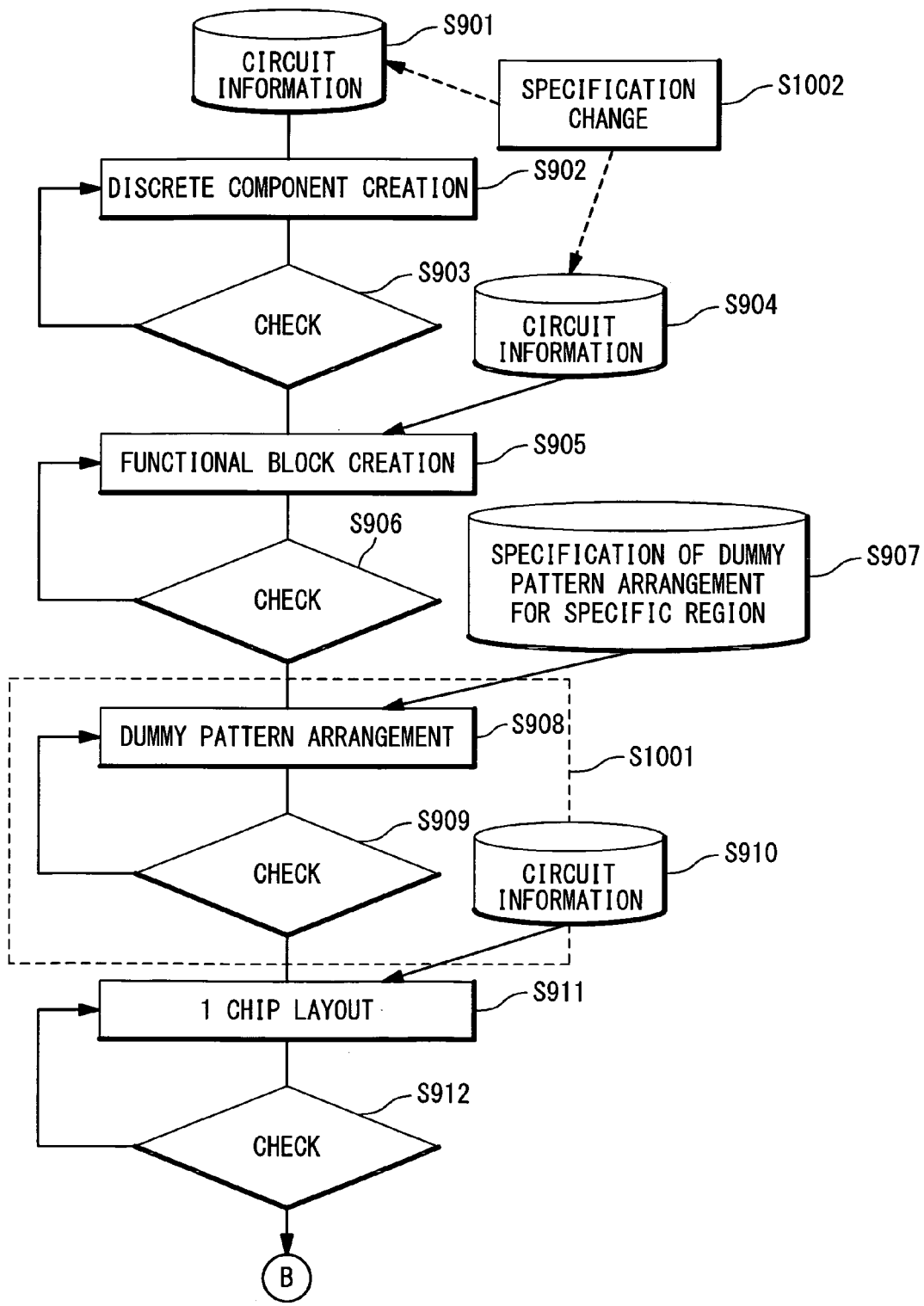
FIG. 10A is an explanatory flow for explaining the problem 1 in the related technique 2.
Figure 10B:
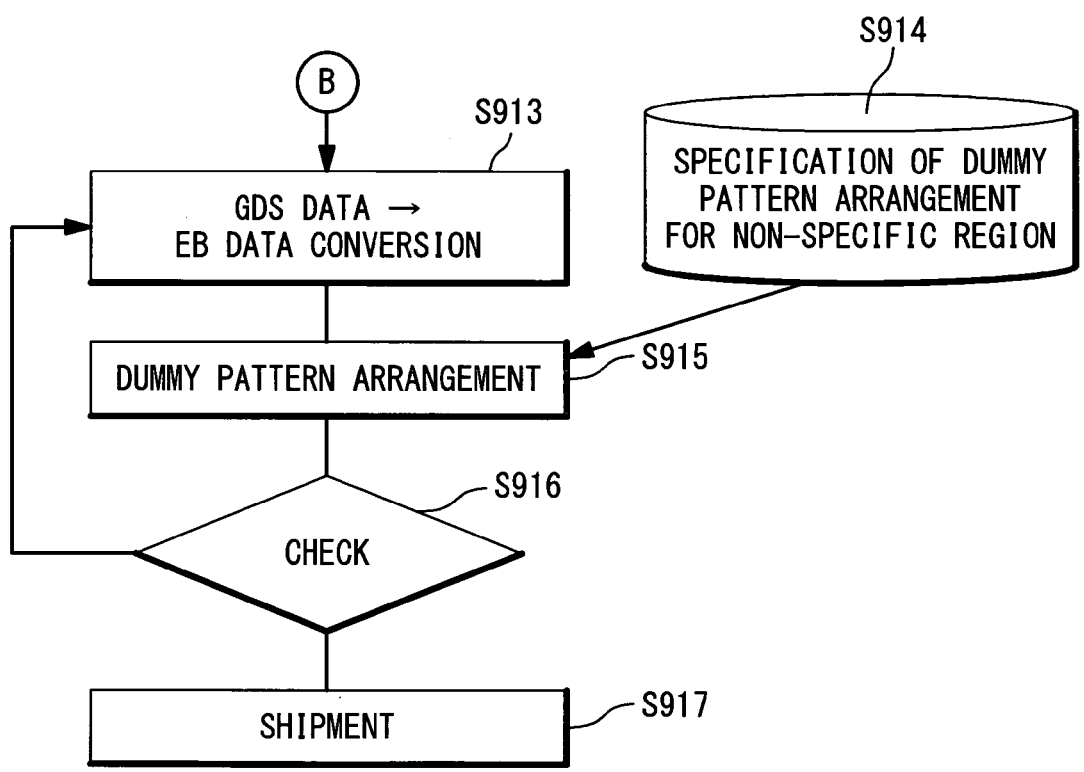
FIG. 10B is an explanatory flow for explaining the problem 1 in the related technique 2.

As explained in FIGS. 10A and 10B, in the case of the dummy pattern arrangement in the related technique 2, it is necessary to redo the dummy pattern creation each time the layout is corrected. The dummy pattern elements must be arranged being separated from a shaped pattern forms elements by a certain distance. Therefore, each time the layout is corrected, it is necessary to redo the arrangement of the dummy patterns. However, according to embodiments of the present invention, it is possible to create the dummy patterns not at the layout stage but at the EB processing stage. Therefore, the dummy pattern arrangement can be performed independently on the layout correction.

Figure 11A:
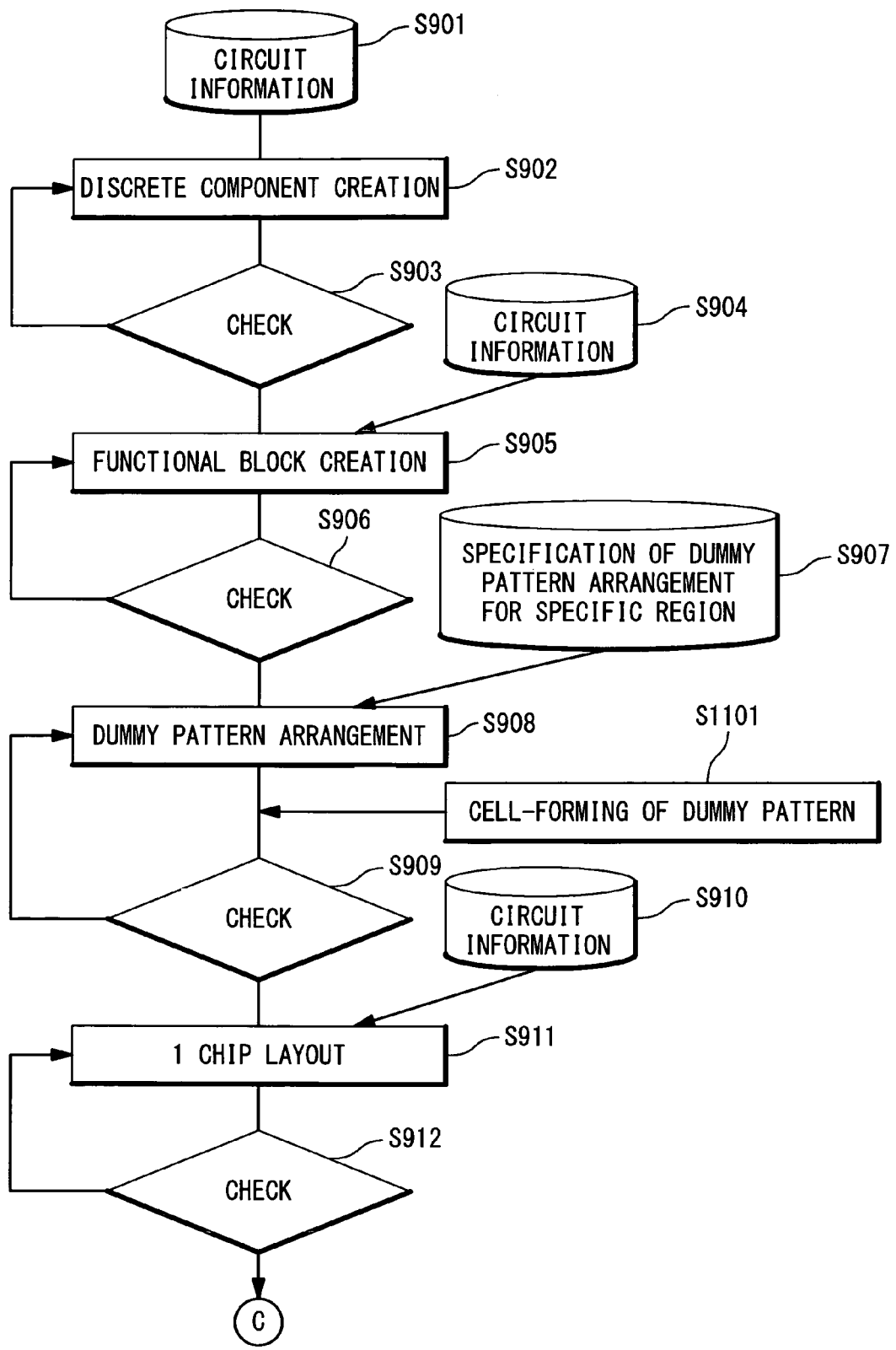
FIG. 11A is an explanatory flow for explaining the problem 2 in the related technique 2.
Figure 11B:
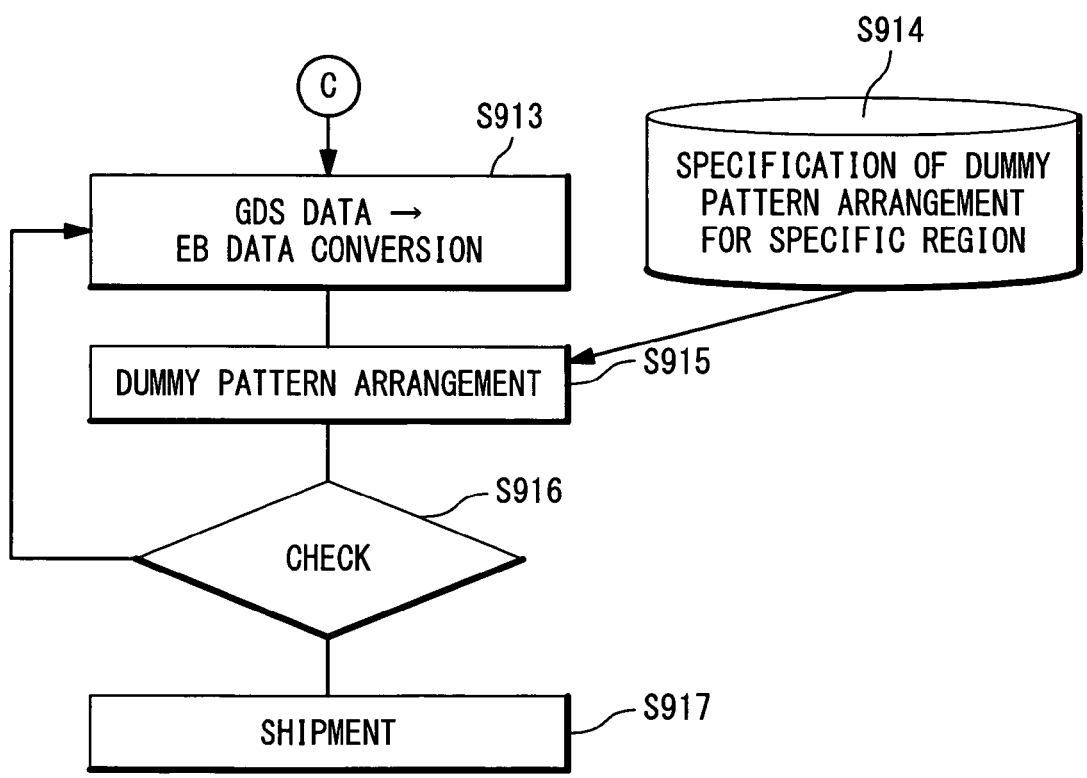
FIG. 11B is an explanatory flow for explaining the problem 2 in the related technique 2.
Figure 11C:
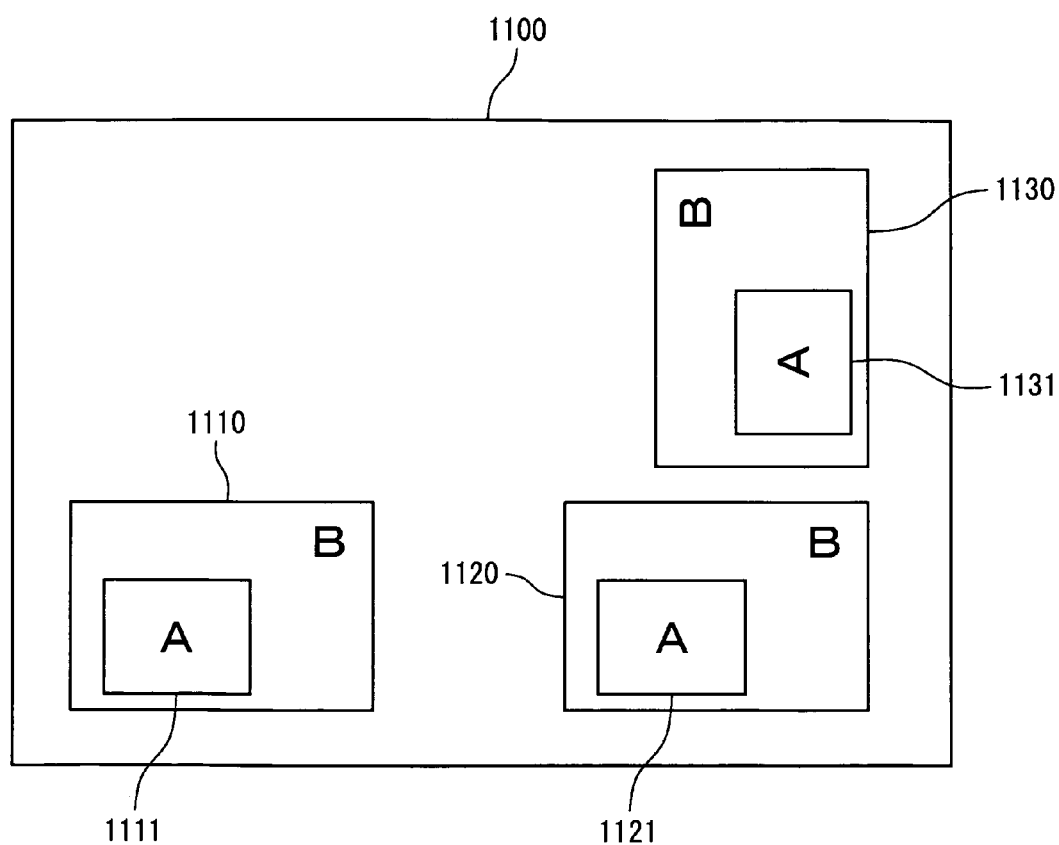
FIG. 11C is an explanatory plan view for explaining the problem 2 in the related technique 2.

As explained in FIG. 11 (Problem 2), with the dummy pattern arrangement method in the related technique 2, there is a case that areas A exist in which the respective dummy patterns are intended to be created in a same arrangement for the layout after the creation of the functional blocks. In such a case, it is necessary to insert the dummy patterns into the data hierarchy level on which the areas A are formed and perform hierarchical structure correction after creating the dummy patterns, and it is required to redo subsequent layout processing. However, since in embodiments of the present invention, the dummy pattern can be created not at the layout stage, but at an EB processing stage, so that the change of the data hierarchy level is not required.

Figure 12A:
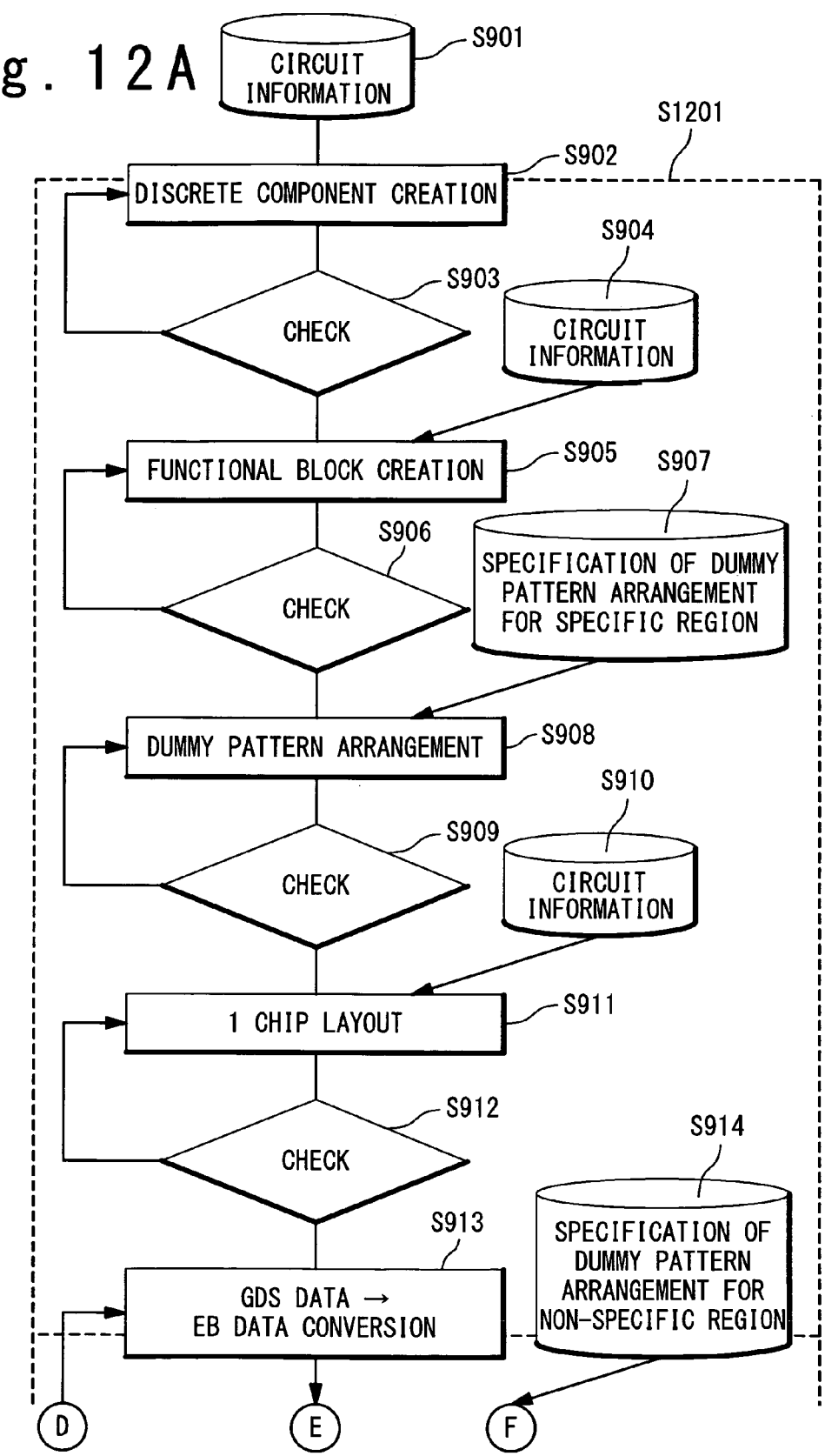
FIG. 12A is an explanatory flow for explaining a problem 3 in the related technique 2.
Figure 12B:
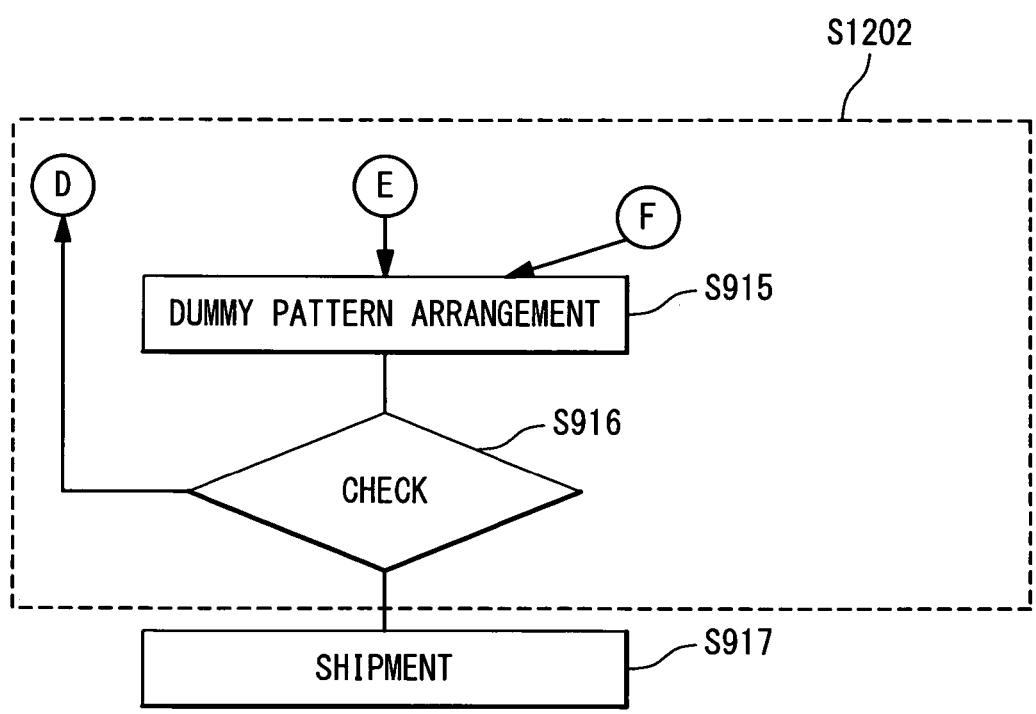
FIG. 12B is an explanatory flow for explaining the problem 3 in the related technique 2.

As explained in FIGS. 12A and 12B (Problem 3), in the case of the dummy pattern arrangement in the related technique 2, it is necessary to create the dummy pattern in the area A at a stage of layout formation. Therefore, the amount of the GDS data being managed by the person in charge of layout increases. When the amount of data increases, not only verification TAT increases, but also a large amount of design environment area is required. However, according to embodiments of the present invention, the dummy pattern creation is performed not at the layout stage but at the EB processing stage, so that the need of processing a large amount of the GDS data can be avoided.

Below, a second embodiment of the present invention will be described.

In a first embodiment, a recognition layer covering the area A is supposed to be a rectangular form. However, in the case that the area A is not a rectangular form, it is possible to arrange a same dummy pattern on a plurality of areas A by covering a recognition layer for performing the calculation method similar to a first embodiment.

Figure 22:
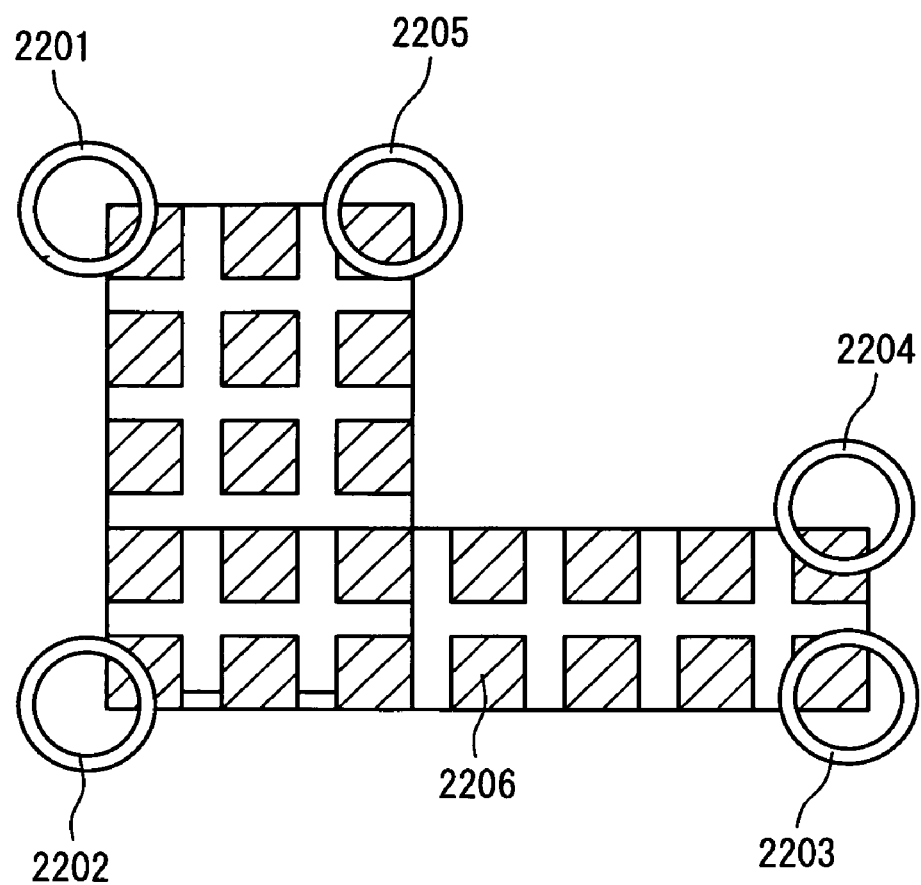
FIG. 22 is an explanatory plan view 1 (L-shaped pattern) of a second embodiment.

For example, if the area A is L-shaped form as shown in FIG. 22, the dummy pattern in this L-shaped area can be arranged in the same manner, when the points 2201, 2202, 2203, and 2204, and 2205 coincides with the recognition layer explained before, the dummy pattern 2206 in each L-shaped area can be formed in a same arrangement, even a plurality of the L-shaped area are arranged in different rotation angles.

Figure 23:
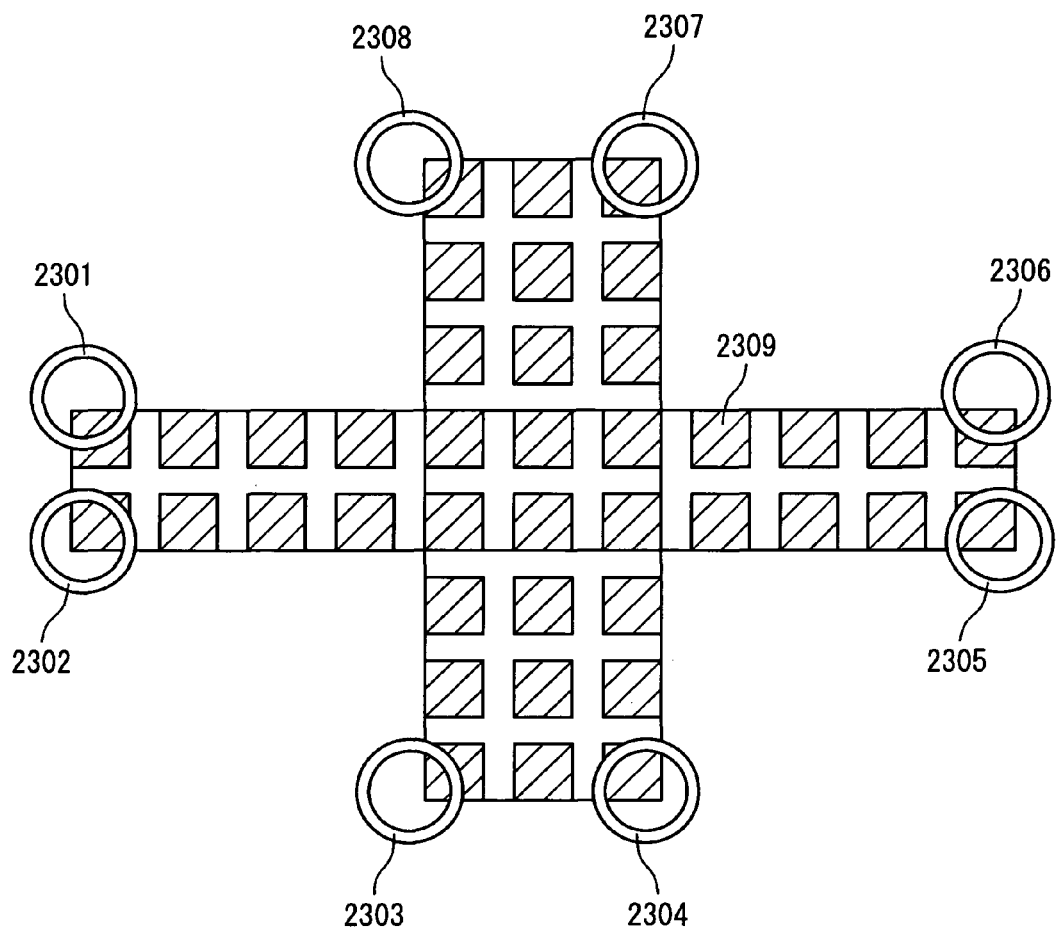
FIG. 23 is an explanatory plan view 2 (cruciform pattern) of a second embodiment.

Moreover, also in a case where the area A is in a cross shape (cruciform) as shown in FIG. 23, it is possible to arrange the dummy pattern 2309 in each area A in a same arrangement, by applying the algorithm of the recognition layer described in a first embodiment to the points of the cross shape pattern, i.e., a point 2301, a point 2302, a point 2303, a point 2304, a point 2305, a point 2306, a point 2307, and a point 2308 thereof.

Next, a third embodiment of the present invention will be described.

Figure 24:
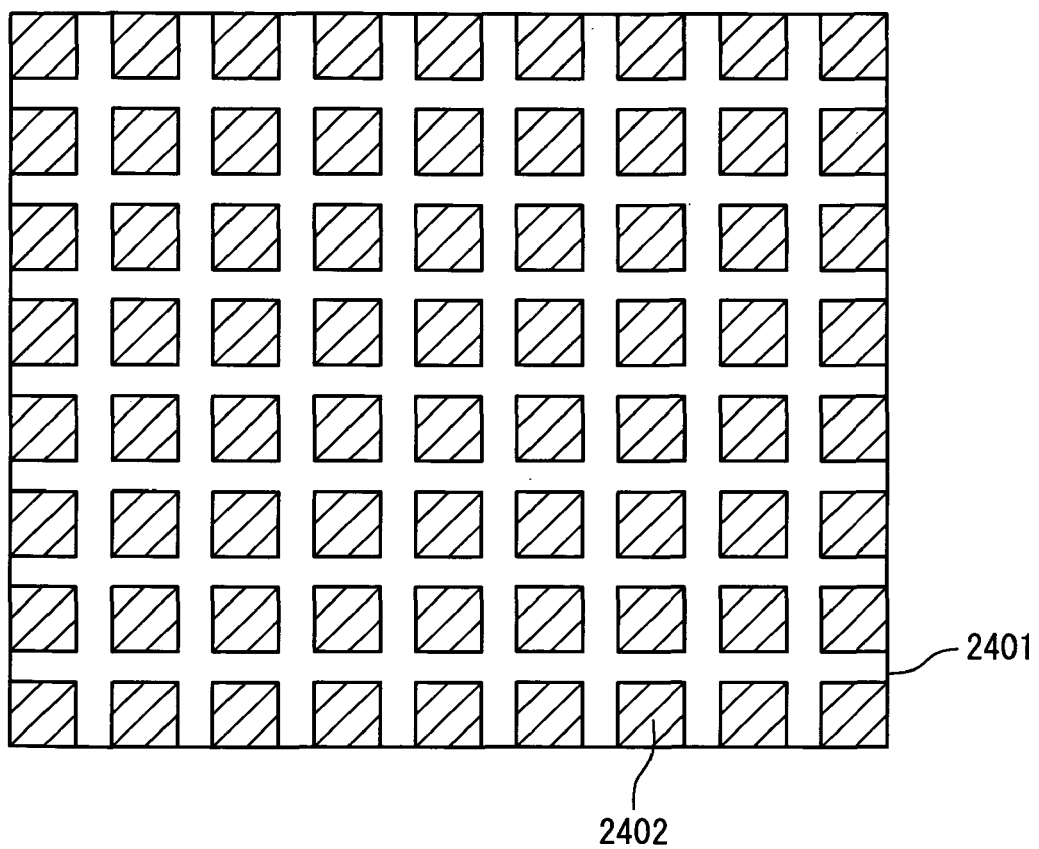
FIG. 24 is an explanatory plan view 1 (grid pattern) of a third embodiment.
Figure 25:
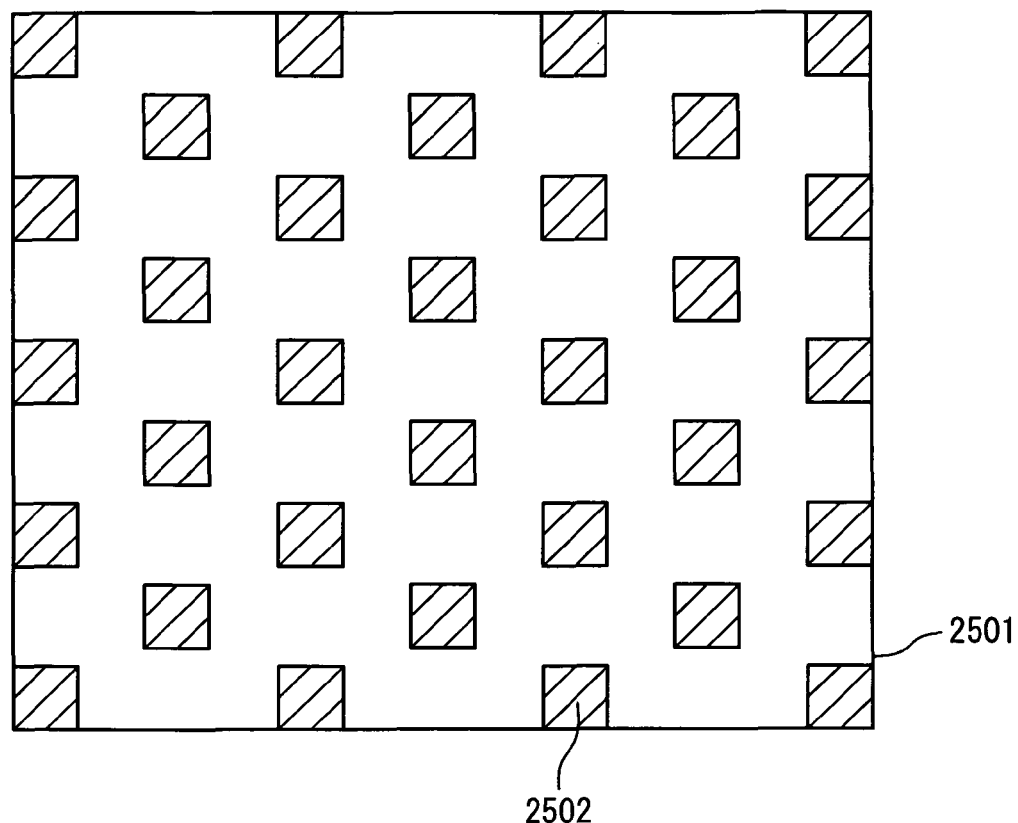
FIG. 25 is an explanatory plan view 2 of a third embodiment (knight's move arrangement)

In a first embodiment, the dummy pattern consists of dummy pattern elements arranged to form a grid pattern as shown in FIG. 24. In a third embodiment, the dummy pattern elements composing the dummy pattern are arranged so that any dummy pattern element is positioned in the knight' move position in the chess to another dummy pattern elements as shown in FIG. 25. That is, the both dummy pattern arrangements are also possible: in the grid pattern like dummy patterns 2402 in an area A 2401 of FIG. 24; and in a knight's move pattern like dummy patterns 2502 in an area A 2501 as shown in FIG. 25. In other words, it is also possible to arrange the dummy pattern elements in a various patterns like grid pattern, a checkerboard pattern, etc. by setting appropriate gaps among the individual dummy patterns elements. Even in the area A having these patterns, by covering each area A by the recognition layer as explained in a first embodiment, a same dummy patterns can be formed in the areas A.

Next, a fourth embodiment of the present invention will be described. In a first embodiment, dummy patterns of one kind are created. In a fourth embodiment, recognition layers of a plurality of kinds are provided for covering areas. Different EB operations are applied to each kind of recognition layer, so that dummy patterns of a plurality of kinds having different shape to each other can be created.

Figure 26:
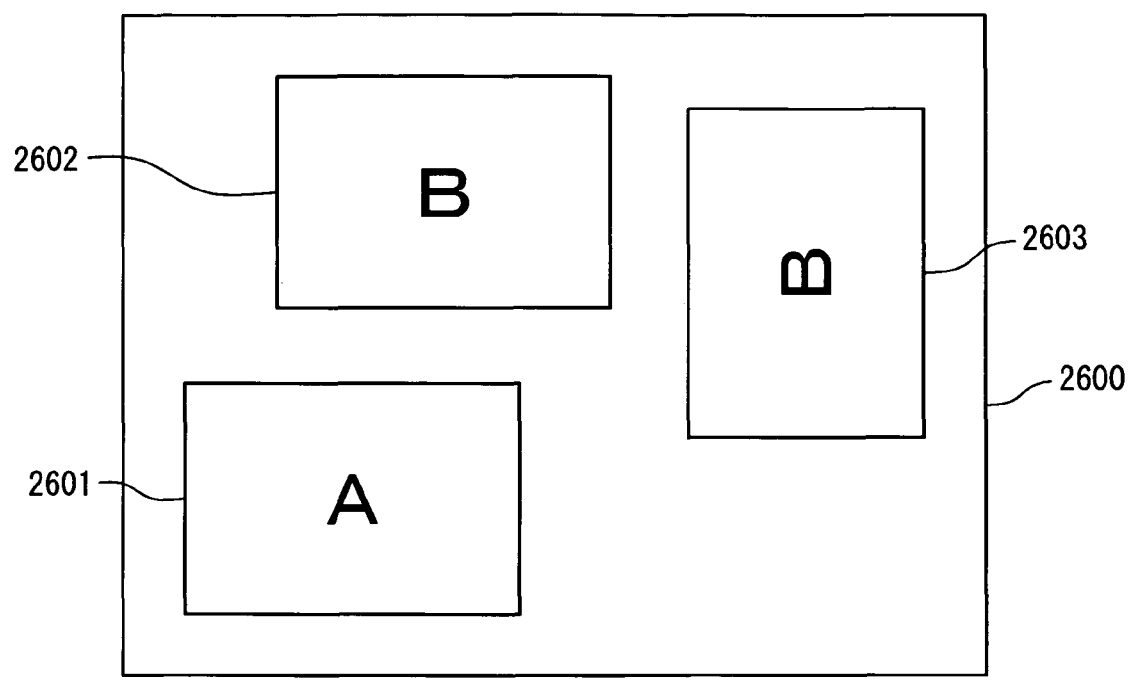
FIG. 26 is an explanatory plan view of a fourth embodiment.

As shown in FIG. 26, in a case where an area A 2601, an area B 2602, and an area B 2603 exist on a chip area 2600, by covering the area A and the areas B with the recognition layers calculated by the technique explained in a first embodiment, respectively, and specifying the EB operations for the respective layers, it becomes possible to arrange the respective dummy patterns with different shapes in the area A and in the area B. Moreover, it becomes possible to arrange the dummy patterns with a same shape in the area B 2602 and in the area B 2603.

Further, in this embodiment, it is possible to designate a plural kinds of dummy pattern sizes and a dummy pattern arrangements appropriate for each area in EB operation.

As explained above, following effects are brought about according to embodiments of the present invention.
(1) The shape of the dummy pattern and their arrangement positions in a certain area can be secured by covering the area with the recognition layer.
(2) It becomes possible to specify a plurality of areas and to create different dummy patterns therein on the EB operation.
(3) It becomes possible to arrange the dummy patterns with an identical shape in areas without being influenced by an arrangement orientation of each area by equipping each recognition layer with an algorithm.
(4) It becomes possible to arrange dummy patterns with an identical shape in areas with an identical shape by equipping the recognition layers with an algorithm.
(5) Since the dummy pattern creation is performed on the EB operation, the dummy pattern creation is not influenced by the layout correction.
(6) Since the dummy pattern creation is not performed at the time of the layout formation, it is not required to correct cell hierarchy structure on GDS data.
(7) Since the dummy patterns are not held on the GDS data, it becomes unnecessary for a layout designer to deal with large GDS data.

According to embodiments of the present invention, methods for generating the recognition shape that enables same arrangement of dummy patterns and the dummy pattern arrangement flow that uses recognition layers can be realized.

Although the present invention has been described above in connection with several embodiments thereof, it would be apparent to those skilled in the art that those exemplary embodiments are provided solely for illustrating the present invention, and should not be relied upon to construe the appended claims in a limiting sense.

What is claimed is:

1. A dummy pattern arrangement apparatus comprising:
a recognition layer insertion section configured to insert a plurality of recognition layers, each of the plurality of recognition layers covers a specific area on a chip area layout;
a dummy pattern arrangement section configured to designate a corner positioned at a same direction on the chip area layout for each of the plurality of recognition layers as a dummy pattern creation starting point, and create a dummy pattern on the specific area from the dummy pattern creation starting point in EB data (Electron Beam Exposure Data), wherein the dummy pattern is determined to satisfy a condition that a positional relation between the dummy pattern and a circuit formed on the chip area layout in each of the plurality of recognition layers is determined to be same, and wherein the dummy pattern consists of a plurality of dummy pattern elements which are periodically arranged in X-direction and Y-direction,
the X-direction size and the Y-direction size of each of the plurality of dummy pattern elements are same value represented by DP,
the X-direction gap and the Y-direction gap of adjacent elements of the plurality of dummy pattern elements are same value represented by GAP, and
X-direction size $X_R$ and Y-direction size $Y_R$ of the recognition layer are determined by following:

$$X_R = a(DP+GAP)+DP$$

$$Y_R = b(DP+GAP)+DP,$$

wherein a and b are positive integers, respectively.

2. The dummy pattern arrangement apparatus according to claim 1, wherein the dummy pattern arrangement section is configured to create a non-specific area dummy pattern which has a different pattern from the dummy pattern on the chip area layout where the recognition layer is not arranged, and wherein the non-specific area is an area outside the specific area.

3. The dummy pattern arrangement apparatus according to claim 1, further comprising:
a discrete component creation section configured to create data of a discrete component based on circuit information for creating a discrete component, and
the recognition layer insertion section inserts a recognition layer of the plurality of recognition layers in a position covering a discrete component when the specific area exists in a position of the discrete component indicated in the data of discrete component.

4. The dummy pattern arrangement apparatus according to claim 1, further comprising:
a functional block creation section configured to create data of a functional block based on circuit information for creating a functional block, and
the recognition layer insertion section inserts a recognition layer of the plurality of recognition layers in a position covering a functional block when the specific area exists in a position of the functional block indicated in the data of functional block.

5. The dummy pattern arrangement apparatus according to claim 1, further comprising:

a 1-chip layout creation section configured to create a 1-chip layout based on circuit information for creating the 1-chip layout, and the recognition layer insertion section inserts the recognition layer in the specific area after the 1-chip layout is created.

6. The dummy pattern arrangement apparatus according to claim 1, wherein the recognition layer insertion section inserts the plurality of recognition layers on a chip area layout in GDS (General Data Stream) data, and the dummy pattern arrangement apparatus further comprises:

a data conversion section configured to convert the GDS data into the EB data.

7. The dummy pattern arrangement apparatus according to claim 1, wherein the corner is determined dependently on a shape of each of the plurality of recognition layers.

8. The dummy pattern arrangement apparatus according to claim 1, wherein the recognition layer insertion section discriminates the plurality of recognition layers into a plurality of kinds, and the dummy pattern arrangement section create the dummy pattern which is determined dependently on a kind of the plurality of kinds of corresponding recognition layer of the plurality of recognition layers.

* * * * *